US010896219B2

(12) United States Patent
Tokuchi

(10) Patent No.: US 10,896,219 B2
(45) Date of Patent: Jan. 19, 2021

(54) INFORMATION PROCESSING APPARATUS, DATA STRUCTURE OF IMAGE FILE, AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 167 days.

(21) Appl. No.: 15/936,448

(22) Filed: Mar. 27, 2018

(65) Prior Publication Data

US 2019/0079954 A1   Mar. 14, 2019

(30) Foreign Application Priority Data

Sep. 13, 2017   (JP) ................. 2017-176001

(51) Int. Cl.
| G06F 16/58 | (2019.01) |
| G06F 3/0354 | (2013.01) |
| G06F 3/0484 | (2013.01) |
| G06F 3/0481 | (2013.01) |
| G06F 3/0482 | (2013.01) |
| H04L 12/28 | (2006.01) |

(52) U.S. Cl.
CPC ............ *G06F 16/58* (2019.01); *G06F 3/0354* (2013.01); *G06F 3/0482* (2013.01); *G06F 3/0484* (2013.01); *G06F 3/04812* (2013.01); *G06F 3/04845* (2013.01); *H04L 12/282* (2013.01); *G06F 2203/0383* (2013.01)

(58) Field of Classification Search
CPC .... G06F 16/58; G06F 3/0482; G06F 3/04812; G06F 3/0484; G06F 3/04845; G06F 3/0354; G06F 2203/0383; H04L 12/282; H04N 5/76; G06N 3/008; G06K 9/00664
See application file for complete search history.

(56) References Cited

U.S. PATENT DOCUMENTS

| 10,026,229 | B1* | 7/2018 | Yalniz | ................ G06K 9/00671 |
| 2002/0021304 | A1 | 2/2002 | Eguchi | |
| 2005/0073594 | A1 | 4/2005 | Tagawa | |
| 2005/0162520 | A1* | 7/2005 | Karasaki | ............ H04N 1/00172 348/207.2 |
| 2005/0193006 | A1* | 9/2005 | Bandas | .............. G06K 9/00664 |
| 2010/0049740 | A1* | 2/2010 | Iwase | .................... G06F 19/321 705/7.27 |
| 2010/0134410 | A1* | 6/2010 | Tomisawa | .......... G02B 27/2214 345/156 |
| 2012/0151397 | A1* | 6/2012 | Oberstein | ............. G06F 16/168 715/769 |

(Continued)

FOREIGN PATENT DOCUMENTS

| JP | 2002024584 | 1/2002 |
| JP | 2002132558 | 5/2002 |
| JP | 2004120069 | 4/2004 |

*Primary Examiner* — Ming Y Hon
(74) *Attorney, Agent, or Firm* — JCIPRNET

(57) ABSTRACT

An information processing apparatus includes a recognition unit and a controller. The recognition unit recognizes a user's designation for an image including an object associated with attribute information. When the user's designation of the object on the image is recognized, the controller executes a workflow process defined by the attribute information based on the attribute information associated with the object and information related to a real space.

28 Claims, 30 Drawing Sheets

(56) References Cited

U.S. PATENT DOCUMENTS

| | | | |
|---|---|---|---|
| 2012/0209574 A1* | 8/2012 | Moreau | G06F 17/50 703/1 |
| 2013/0044912 A1* | 2/2013 | Kulkarni | G06K 9/00671 382/103 |
| 2013/0278633 A1* | 10/2013 | Ahn | G06T 19/006 345/633 |
| 2014/0047413 A1* | 2/2014 | Sheive | H04L 65/403 717/110 |
| 2014/0237366 A1* | 8/2014 | Poulos | G06F 3/013 715/728 |
| 2015/0016735 A1* | 1/2015 | Kikuchi | G06T 9/00 382/232 |
| 2015/0080125 A1* | 3/2015 | Andre | A63F 3/00075 463/31 |
| 2016/0026853 A1* | 1/2016 | Wexler | H04N 5/2254 382/103 |
| 2016/0054797 A1* | 2/2016 | Tokubo | G06F 3/041 345/633 |
| 2018/0122142 A1* | 5/2018 | Egeler | G06F 3/011 |

* cited by examiner

SIGNAL OF RECORDING START

SIGNAL OF REPRODUCTION START

INSTRUCT TO STORE SCANNED IMAGE IN COMPUTER

INSTRUCT TO STORE OPERATION LOGS IN COMPUTER

INSTRUCT FACSIMILE TRANSMISSION OF IMAGE

INSTRUCT TO PRINT IMAGE

↓ INSTRUCT TO OUTPUT REMAINING AMOUNT OF TONER TO COMPUTER

INSTRUCT AIR CONDITIONER TO ADJUST TEMPERATURE TO BE SUITABLE FOR MR. A

INFORMATION PROCESSING APPARATUS, DATA STRUCTURE OF IMAGE FILE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-176001 filed Sep. 13, 2017.

BACKGROUND

Technical Field

The present invention relates to an information processing apparatus, a data structure of an image file, and a non-transitory computer readable medium.

SUMMARY

According to an aspect of the invention, an information processing apparatus includes a recognition unit and a controller. The recognition unit recognizes a user's designation for an image including an object associated with attribute information. When the user's designation of the object on the image is recognized, the controller executes a workflow process defined by the attribute information based on the attribute information associated with the object and information related to a real space.

BRIEF DESCRIPTION OF THE DRAWINGS

Exemplary embodiments of the present invention will be described in detail based on the following figures, wherein:

FIG. 7A illustrates the real space, and FIG. 7B illustrates the still image;

FIG. 8A illustrates a display state of the still image until one of images is selected, and FIG. 8B illustrates the display state of the still image after one of the images is selected;

FIG. 9A illustrates the display state of the still image until one of the images is selected, and FIG. 9B illustrates the display state of the still image after one of the images is selected;

FIG. 10A illustrates a state in which a notification screen is displayed, and FIG. 10B illustrates a state in which an operation screen is displayed;

FIG. 11A illustrates the display state of the still image after one of the images is selected, and FIG. 11B illustrates another display example of the notification screen;

FIG. 12A illustrates the display state of the still image until one of the images is selected, and FIG. 12B illustrates the display state of the still image after one of the images is selected;

FIG. 13A illustrates the display state of the still image until one of the images is selected, and FIG. 13B illustrates the display state of the still image after one of the images is selected;

FIG. 14A illustrates a state in which two images are sequentially selected on the still image, and FIG. 14B illustrates an operation situation in a real space;

FIG. 15A illustrates a state in which two images are sequentially selected on the still image, and FIG. 15B illustrates an operation situation in a real space;

FIG. 16A illustrates a state in which two images are sequentially selected on the still image, and FIG. 16B illustrates an operation situation in a real space;

FIG. 17A illustrates a state in which two images are sequentially selected on the still image, and FIG. 17B illustrates an operation situation in a real space;

FIG. 18A illustrates a state in which two images are sequentially selected on the still image, and FIG. 18B illustrates an operation situation in a real space;

FIG. 19A illustrates a state in which two images are sequentially selected on the still image, and FIG. 19B illustrates an operation situation in a real space;

FIG. 20A illustrates a case where two images are sequentially designated in a still image whose display is changed to reflect a state of a real device, and FIG. 20B illustrates a state of the real space;

FIG. 21A illustrates a case where two images are sequentially designated in a still image whose display is changed to reflect a state of a real device, and FIG. 21B illustrates a state of the real space;

FIG. 22A illustrates a state in which two images are sequentially selected on the still image, and FIG. 22B illustrates an operation situation in a real space;

FIG. 25A illustrates a data structure before information is included in the attribute information of a JPEG file, and FIG. 25B illustrates a state in which information is added to the attribute information of the JPEG file;

FIG. 26A illustrates a still image, and FIG. 26B illustrates contents of the information described in the JPEG file;

FIG. 27A illustrates a still image, and FIG. 27B illustrates contents of the information described in the JPEG file;

FIG. 28A illustrates designation of an image during reproduction of the moving image, and FIG. 28B illustrates the operation performed in the real space;

FIG. 29A illustrates designation of an image during reproduction of the moving image, and FIG. 29B illustrates the operation performed in the real space; FIG. 30A illustrates designation of an image during reproduction of the moving image, and FIG. 30B illustrates the operation performed in the real space.

DETAILED DESCRIPTION

Hereinafter, exemplary embodiments of the present invention will be described with reference to the accompanying drawings.

First Exemplary Embodiment

In the present exemplary embodiment, an example of a JPEG file compliant with the JPEG format will be described for the sake of convenience, but the present disclosure may be applied to other image files compliant with other image formats.

Data Structure of Still Image File

Figure 1:
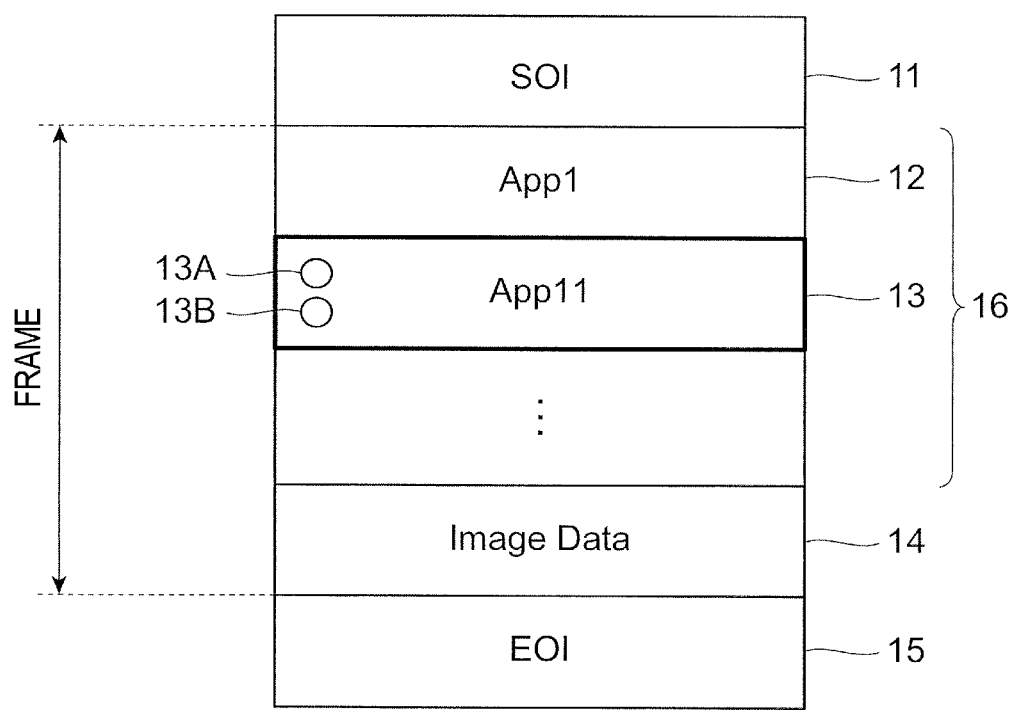
FIG. 1 is a view illustrating a data structure of a JPEG file used in the present exemplary embodiment.

FIG. 1 is a view illustrating a data structure of a JPEG file 10 used in the present exemplary embodiment. The JPEG file 10 is an example of an image file and is compliant with the JPEG format.

The JPEG file 10 includes: a start of image segment (SOI) 11 representing a start position of an image; an application type 1 segment (App1) 12 used in the description of Exif information or the like; an application type 11 segment (App11) 13 used in the description of information that defines a workflow process related to an object; image data (ID) 14; and an end of image segment (EOI) 15 representing an end position of the image.

Here, the main body of a still image is stored in the image data 14. The image data 14 is an example of a first data region.

A region interposed between the start of image segment 11 and the end of image segment 15 is also referred to as a frame.

Although not illustrated in FIG. 1, the JPEG file also includes two segments (not illustrated), that is, a define quantization table segment (DQT) and a define Huffman table segment (DHT). Segments other than these are provided as required.

The application type 1 segment 12 and the application type 11 segment 13 are portions of the attribute information 16 of the JPEG file 10. The attribute information 16 is an example of a second data region.

Information 13A and information 13B are described in the application segment 13. The information 13A and the information 13B define workflow processes associated with an object(s) included in a still image for which the JPEG file 10 is created. For example, the information 13A corresponds to a workflow process 1 related to an object 1, and the information 13B corresponds to a workflow process 2 related to an object 2.

The number of pieces of information stored in the application type 11 segment 13 may be zero, one, or three or more. Hereinafter, when the information 13A and the information 13B are not distinguished from each other, they are simply referred to as information 13A.

For example, the two pieces of information 13A and 13B may be associated with a single object. That is, plural pieces of information may be associated with a single object.

For example, the information 13A may be used for processing associated with a first language (for example, Japanese for a first OS), and the information 13B may be used for processing associated with a second language (for example, English for a second OS). For example, a user may designate, through a selection screen, a language in which the workflow process is to be executed.

Individual workflow processes include, for example, storing, displaying, aggregating, transmitting, and acquiring of information on objects corresponding to the information 13A and 13B. The information on objects includes, for example, information stored in a real article, an image obtained by capturing the real article, and information managed in the real space on the real article in addition to information existing on the Internet.

Further, the individual workflow processes include, for example, displaying of an operation panel for controlling the operation of a real device corresponding to the object associated with the information 13A and 13B, controlling of the operation of the real device which is determined in the information 13A and 13B in advance, acquiring of information from the real device corresponding to the object, and reflecting of an acquired real device state to the image.

In addition, for example, the both information 13A and 13B may be provided for each of the operation types of one device. For example, the information 13A may be used to operate the channel of a television receiver, and the information 13B may be used to operate the power button of the television receiver.

For example, the information 13A and 13B are described in the form of text data. In the present exemplary embodiment, the Java Script Object Notation (JSON), which is an example of a data exchange format, is used to describe the information 13A and 13B.

The JSON (registered trademark) is a language that uses a portion of the object notation in JavaScript (registered trademark) as a syntax base. Of course, the language used to describe the workflow process is not limited to the JSON.

Configuration of Image Processing System and Information Processing Apparatus

Figure 2:
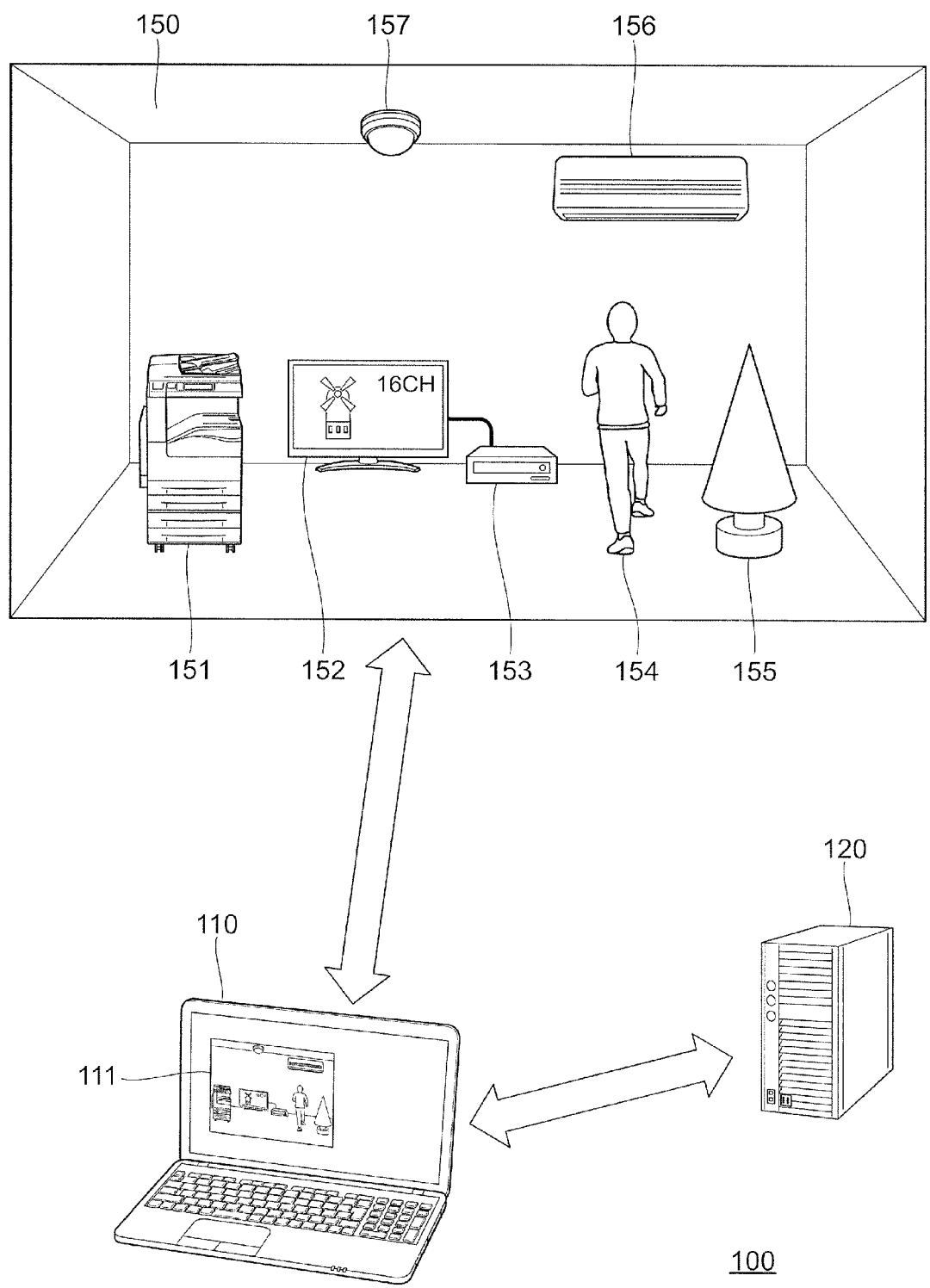
FIG. 2 is a view illustrating a configuration example of an image processing system used the present exemplary embodiment.

FIG. 2 is a view illustrating a configuration example of an image processing system 100 used in the present exemplary embodiment.

The image processing system 100 includes a portable computer 110 used to display a still image 111 (for example, an electronic photograph), a server device 120 that executes a part or all of processing functions in cooperation with the computer 110, and devices existing in the real space 150 corresponding to the location where the still image 111 is captured.

The computer 110 and the server device 120 are an example of the information processing apparatus. It should be noted that the server device 120 may be omitted.

The computer 110 of the present exemplary embodiment is not limited to a laptop computer as illustrated in FIG. 2, but may be a tablet computer, a smart phone, a mobile phone, a camera, a portable game machine, or the like.

The real space 150 may be a space which is the same as or different from the space in which the computer 110 exists.

The real space 150 illustrated in FIG. 2 represents a room. The real space 150 includes: an image forming device 151 that has a function of forming an image on a recording material such as paper and a function of optically reading an image of a document; a display device 152 that displays a broadcast program or the like; a recording and reproducing device 153 that records a moving image or sound (hereinafter, referred to as a "moving image, etc.") in a recording medium or reproduces a moving image, etc. from a recording medium; a person 154; a planted tree 155; an air conditioner 156; and a surveillance camera 157.

Further, the real space 150 is not limited to the inside of a room, but may be the outside of a room.

Figure 3:
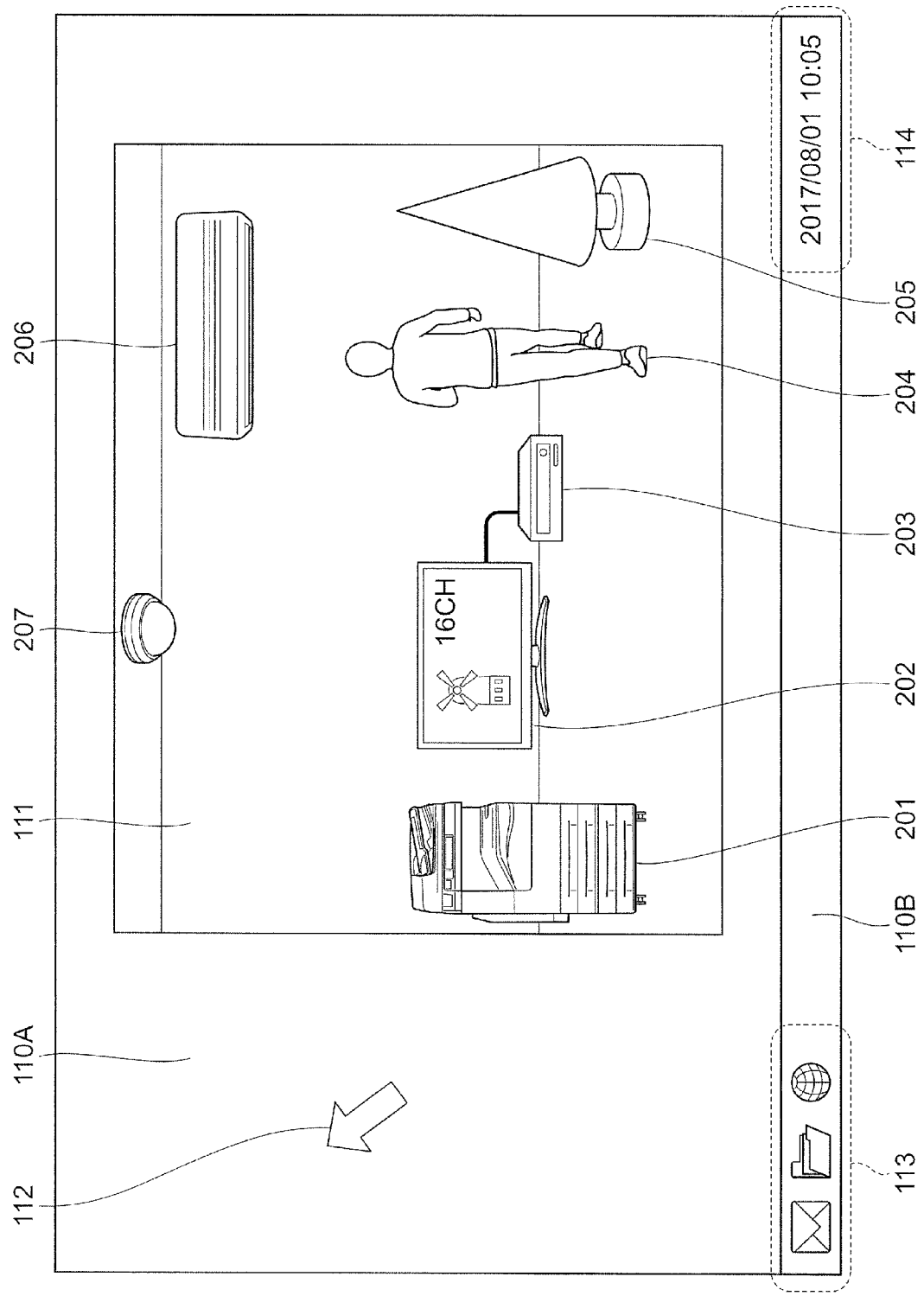
FIG. 3 is an enlarged view illustrating a computer screen.

FIG. 3 is an enlarged view illustrating the screen of the computer 110.

The screen illustrated in FIG. 3 includes an operation screen 110A and a task bar 110B. On this operation screen 110A, the still image 111 obtained by capturing the real space 150 (see FIG. 2) is displayed in the form of a small screen (window). A mouse pointer 112 is used to designate the operation position. The task bar 110B displays three active application icons 113 and a current time 114.

In the present exemplary embodiment, it is assumed that the still image 111 is a so-called electronic photograph. Further, since a moving image is defined as a time sequence of plural still images, a description given below is applicable to a moving image.

The still image 111 illustrated in FIG. 3 includes an image 201 of the image forming device, an image 202 of the display device, an image 203 of the recording and reproducing device, an image 204 of a person, an image 205 of the planted tree, an image 206 of the air conditioner, and an image 207 of the surveillance camera.

The still image 111 represents a state of the real space 150 at a certain time (see FIG. 2). Therefore, the position of the image 204 of the person is different from the position of the person 154 (see FIG. 2) at the current time. Generally, persons and the number of persons at the time of capturing the still image 111 and the number of persons at the time of displaying the still image 111 are different from each other. Also, an image appearing in the image 202 of the display device in the still image 111 is different from an image displayed on the display device 152 at the current time (see FIG. 2).

The data of the still image 111 is stored in the image data 14 portion (see FIG. 1) of the JPEG file 10 (see FIG. 1). In the present exemplary embodiment, the information 13A defining the workflow specific to each of at least one of the seven images included in the still image 111 is described in the attribute information 16 portion (see FIG. 1) of the JPEG file 10 in association with the at least one of the seven images included in the still image 111.

Figure 4:
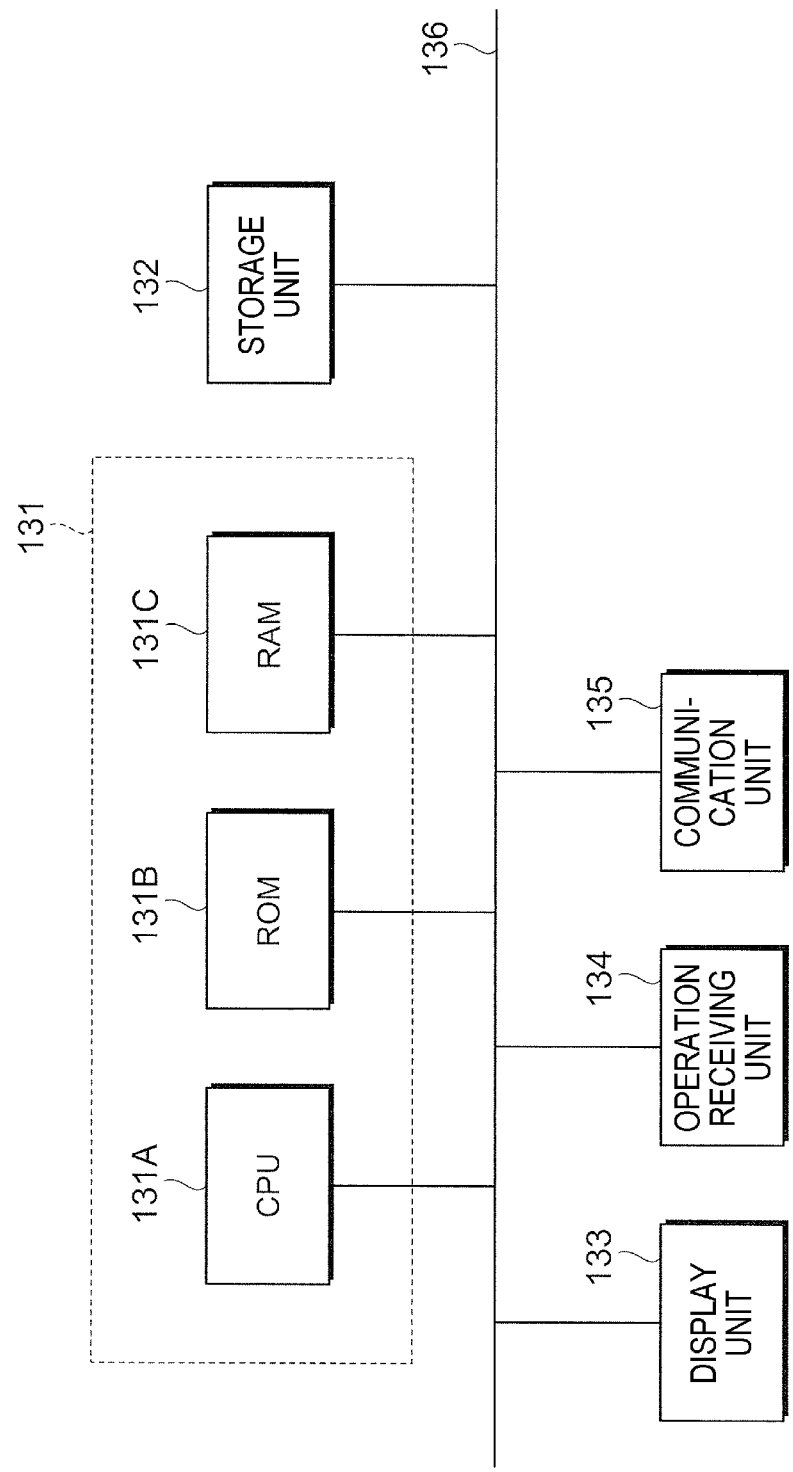
FIG. 4 is a view illustrating an example of a hardware configuration of a computer.

FIG. 4 is a view illustrating an example of a hardware configuration of the computer 110. The basic configuration of the server device 120 is also the same.

The computer 110 includes a controller 131 that controls the entire device, a storage unit 132 used to store the JPEG file 10 and the like, a display unit 133 used to display the operation screen 110A (see FIG. 3), an operation receiving unit 134 that receives a user's input operation, and a communication unit 135 used to communicate with an external device (for example, the server device 120 (see FIG. 1) or the real space 150 (see FIG. 1)). The above-described components are connected to each other via a bus 136.

The controller 131 is an example of a controller, and includes a central processing unit (CPU) 131A, a read only memory (ROM) 131B, and a random access memory (RAM) 131C.

The ROM 131B stores a basic input/output system (BIOS) and an operation system (OS) to be executed by the CPU 131A.

The RAM 131C is used as a working area of an application program.

The controller 131 executes the workflow process defined by the above-described information 13A and 13B through the execution of the application program. Specific examples of the workflow process will be described later.

The storage unit 132 is configured with a storage device such as a hard disk device or a semiconductor memory.

The display unit 133 is a display device that displays various images through the execution of a program (including an operation system and a firmware). The display unit 133 is configured with, for example, a liquid crystal display panel or an organic electroluminescence (EL) display panel.

The operation receiving unit 134 is a device that receives an operation from the user and is configured with, for example, a keyboard, a button, a switch, a touch pad, and a touch panel.

The communication unit 135 is configured with, for example, a local area network (LAN) interface.

Figure 5:
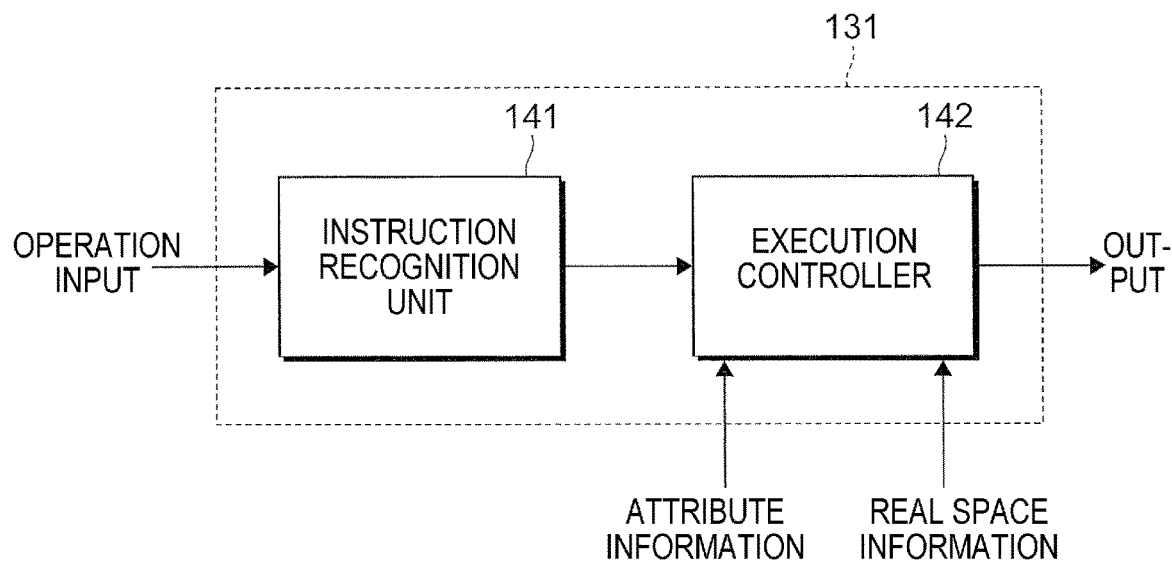
FIG. 5 is a view illustrating an example of a functional configuration of the computer.

FIG. 5 is a view illustrating an example of a functional configuration of the computer 110.

The functional configuration illustrated in FIG. 5 is implemented through the execution of the application program by the controller 131.

The controller 131 functions as an instruction recognition unit 141 that recognizes an instruction which a user inputs through the operation receiving unit 134, and an execution controller 142 that reads and executes the information 13A (see FIG. 1) corresponding to a designated image (object).

Here, the instruction recognition unit 141 is an example of a recognition unit and a detector, and the execution controller 142 is an example of the controller.

The user's instruction is recognized as selection of a specific image (object) included in the still image 111 (see FIG. 3). As will be described later, in designation, plural images may become a target (objects) or a part of an image may become a target (object).

When the entire image is taken as an object, a user's pointing position is given as coordinates (a pixel value, a pixel value) relative to a coordinate system defined for the still image 111 (for example, a coordinate system in which the upper left corner of the still image 111 is taken as the origin). The pointing position may be recognized as a position of a mouse pointer 112 (see FIG. 3) displayed in a superimposed manner on the still image 111. Alternatively, the pointing position may be recognized as a position where the user touches the touch panel sensor disposed on the front side (user side) of the operation screen 110A.

The execution controller 142 executes the workflow process based on the attribute information 16 (see FIG. 1) included in the JPEG file 10 (see FIG. 1) corresponding to the displayed still image 111 and information acquired from the real space (hereinafter, referred to as "real space information").

Figure 6:
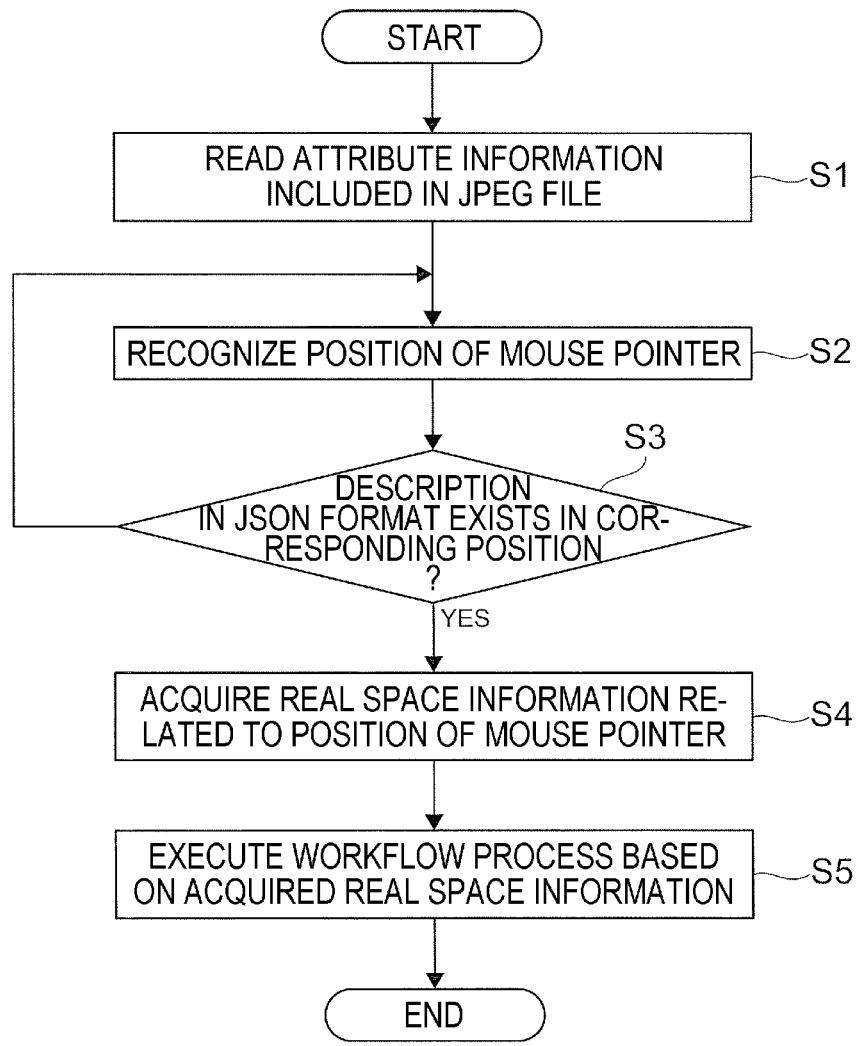
FIG. 6 is a flowchart illustrating an example of a processing operation performed by a controller in a first exemplary embodiment.

FIG. 6 is a flowchart illustrating an example of a processing operation executed by the controller 131 (see FIG. 4) in the first exemplary embodiment.

First, the controller 131 reads the attribute information 16 (see FIG. 1) from the JPEG file 10 (see FIG. 1) corresponding to the still image 111 (see FIG. 3) displayed on the display unit 133 (see FIG. 4) (Step 1).

Next, the controller 131 recognizes the position of the mouse pointer 112 (see FIG. 3) on the still image 111 (Step 2).

Subsequently, the controller 131 determines whether a description in the JSON format (that is, the information 13A) exists in a position designated by the mouse pointer 112 (Step 3).

The position designated by the mouse pointer 112 is the coordinates at which the mouse pointer 112 is located at the time when an operation of specifying the position (for example, left-clicking) is performed with a mouse (not illustrated).

The controller 131 determines whether the position of the mouse pointer 112 is included in the region (object) of the information 13A stored in the attribute information 16. Specifically, the controller 131 determines whether the position of the mouse pointer 112 is included in the region (object) of each image corresponding to the information 13A or the region (object) of a part of the image. In the present exemplary embodiment, the information 13A is registered for each object.

When the position of the mouse pointer 112 recognized by the instruction recognition unit 141 (see FIG. 5) is not included in the region (object) associated with the information 13A, the controller 131 waits until a new position is designated. Further, when the still image 111 (see FIG. 3) displayed on the operation screen 110A (see FIG. 3) is switched, the controller 131 ends the process illustrated in FIG. 6.

On the other hand, when the position of the mouse pointer 112 recognized by the instruction recognition unit 141 is included in the region (object) associated with the information 13A, the controller 131 decodes the description in the JSON format and acquires information on the real space 150 (see FIG. 2) (real space information) related to the position of the mouse pointer 112 (Step 4).

The real space information is information related to a real article corresponding to a place in the real space where the still image 111 is captured and each image in the still image 111.

For example, global positioning system (GPS) information at the time of capturing, which is included in the attribute information 16 (see FIG. 1), is used to acquire the real space information. In addition, for example, a serial number specific to each product that is an object, an address that specifies each device on a communication network, and the like are used to acquire the real space information.

There is no restriction on the communication network. For example, the Internet, a mobile phone network, an Intranet of Things (IoT) network, and a power line communication network may be used. Further, the communication network may be wireless or wired. In addition, the communication between the computer 110 (see FIG. 2) and each device is not necessarily a direct communication and may be a connection via a gateway or a router. Such communication may also be connected by a multi-hop.

In addition, when the computer 110 exits in the real space 150 (see FIG. 2) corresponding to the still image 111 (see FIG. 2), a wireless direct communication is also possible. As for direct communication, for example, Bluetooth (registered trademark), Zigbee (registered trademark), infrared communication, and the like may be used.

Further, in the present exemplary embodiment, since it is only necessary to acquire the real space information, it is not always necessary to designate and communicate with individual devices. An address that enables communication with a device in a room or a spot that is a capturing location may be recorded as information 13A (see FIG. 1), and the real space information that is necessary or obtainable may be collected through a device that the computer 110 has communicated using the address.

In the present exemplary embodiment, it is assumed that the position information necessary for communication is recorded as a part of the information 13A or the attribute information 16. The position information may be registered at the time of capturing or after capturing. The position information may be registered manually or through the execution of an application program.

Also, even if the position information is not included in the information 13A, the address required to communicate with a specific device may be solved using information specifying the device corresponding to or associated with the designated image and an available position database.

The image (object) designated in the still image 111 is not limited to a communicable device. For example, the image 204 of the person (see FIG. 3) or the image 205 of the planted tree (see FIG. 3) may be designated.

In such a case, the GPS information at the time of capturing included in the attribute information 16, the position information related to a communicable device associated with the information 13A corresponding to these images, and the like may be used. For example, the image 207 of the surveillance camera (see FIG. 3) may be designated for the image 205 of the planted tree.

The acquired real space information includes, for example, environmental information. The environmental information includes the temperature, humidity, illuminance, season, weather (including the forecast), and the like at the place where the still image 111 is captured.

The temperature, humidity, illuminance, and the like may be not only values acquired from a sensor provided at the place where the still image 111 is captured, but also values acquired from a sensor provided in a surrounding area of the place where the still image 111 is captured (for example, outside the room where the image is captured). Further, with respect to weather, information published from a weather station or a private weather company may be acquired for an area including the place where the still image 111 is captured.

In addition, the acquired real space information includes information generated or collected by individual devices, images captured by the image 207 of the surveillance camera (see FIG. 3), and the like.

The real space information in the present exemplary embodiment is information at the time when the user performs an operation on the still image 111 (when the designation of a specific object is recognized). That is, it is assumed that the real space information is the latest one available in synchronization with the operation time. Alternatively, a time point in the past may be designated.

When the real space information is acquired in Step 4, the controller 131 decodes the description in the JSON format to execute the workflow process based on the acquired information (Step 5). Specific examples of the workflow process to be executed will be described later.

Further, in the present exemplary embodiment, the acquisition of the real space information (Step 4) and the execution of the workflow process (Step 5) are executed separately. Alternatively, the acquisition of the real space information may be performed as a part of the workflow process.

Use Mode

Hereinafter, a description will be made of use modes that may be implemented through the execution of the workflow process defined by the information 13A (application type 11 segment) described in the attribute information 16.

It is noted that the workflow process and the real space information used in each use mode are only examples.

Figure 7A:
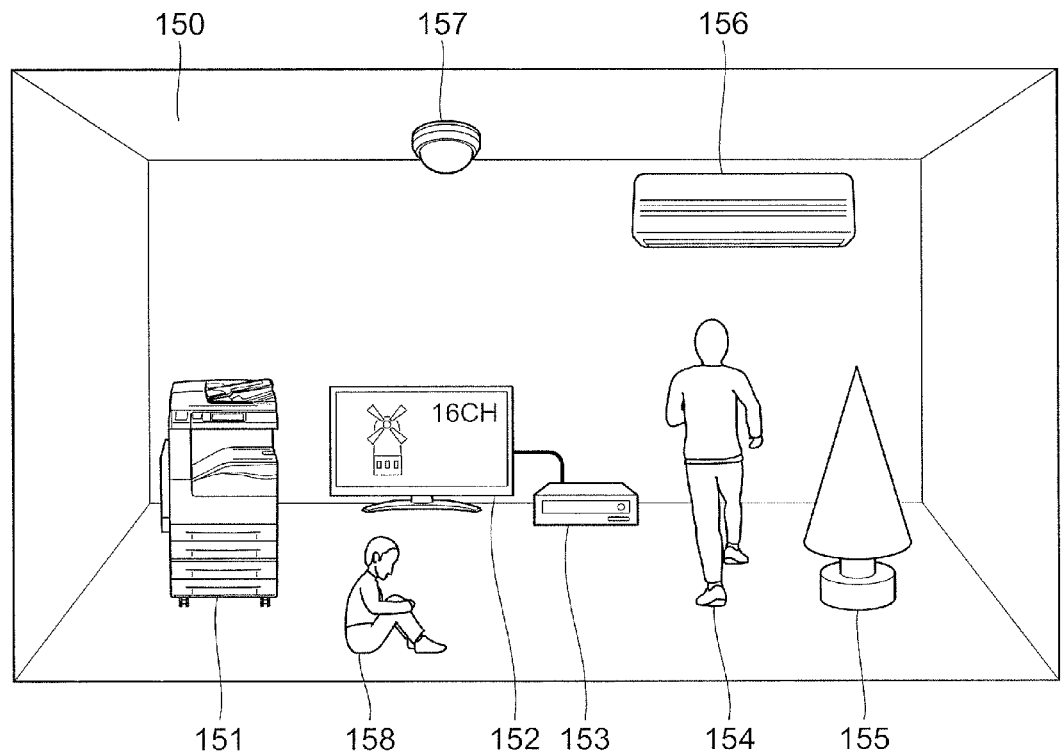
FIGS. 7A and 7B are views illustrating a relationship between a real space assumed in each use mode and a still image displayed on an operation screen of the computer.
Figure 7B:
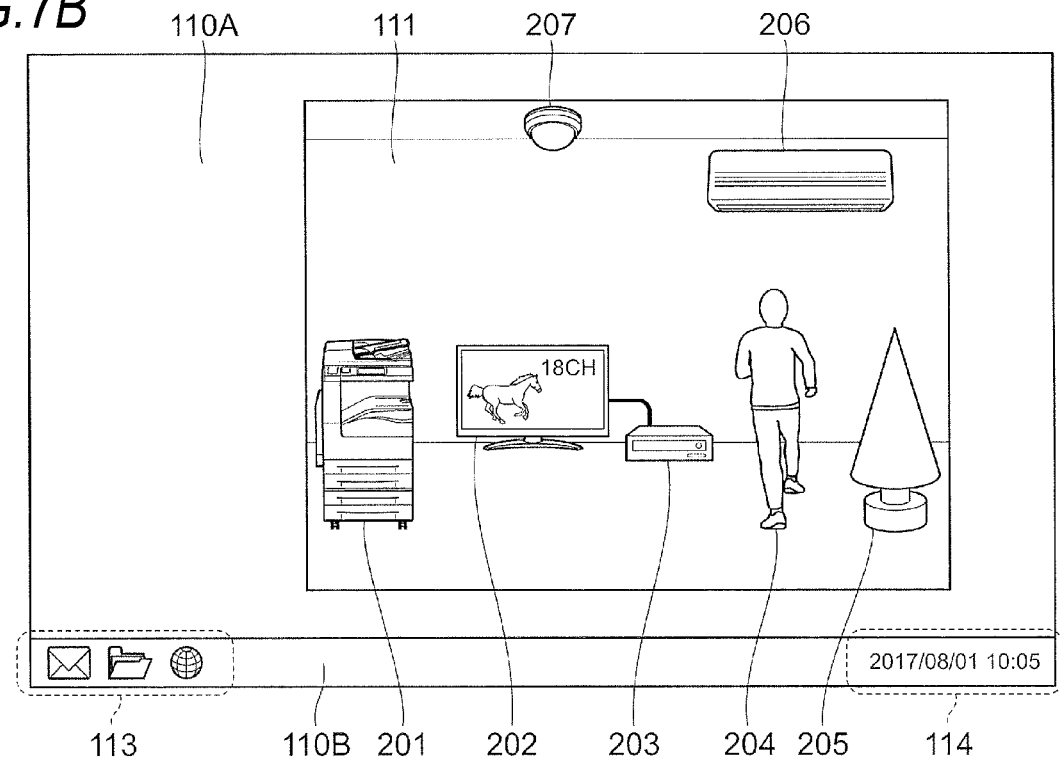

FIGS. 7A and 7B are views illustrating a relationship between a real space 150 that each use mode is premised on and a still image 111 displayed on the operation screen 110A (see FIG. 3) of the computer 110 (see FIG. 2). FIG. 7A illustrates the real space 150, and FIG. 7B illustrates the still image 111.

In the case of FIGS. 7A and 7B, a screen of the display device 152 in the real space 150 displays a program broadcast on Channel 16. In addition, two persons (person 154 and person 158) exist in the real space 150.

On the other hand, in the still image 111 which shows the real space 150 at a time point in the past, the screen of Channel 18 is displayed on the screen of the display device 152 which is an object. In addition, only one person (the image 204 of the person) appears in the still image 111.

First Use Mode

Here, a description will be made of a case where the computer 110 (see FIG. 2) communicates with a real device corresponding to an image designated on the still image 111 to change the display of the corresponding device in the still image 111 based on the information acquired from the real device.

Figure 8A:
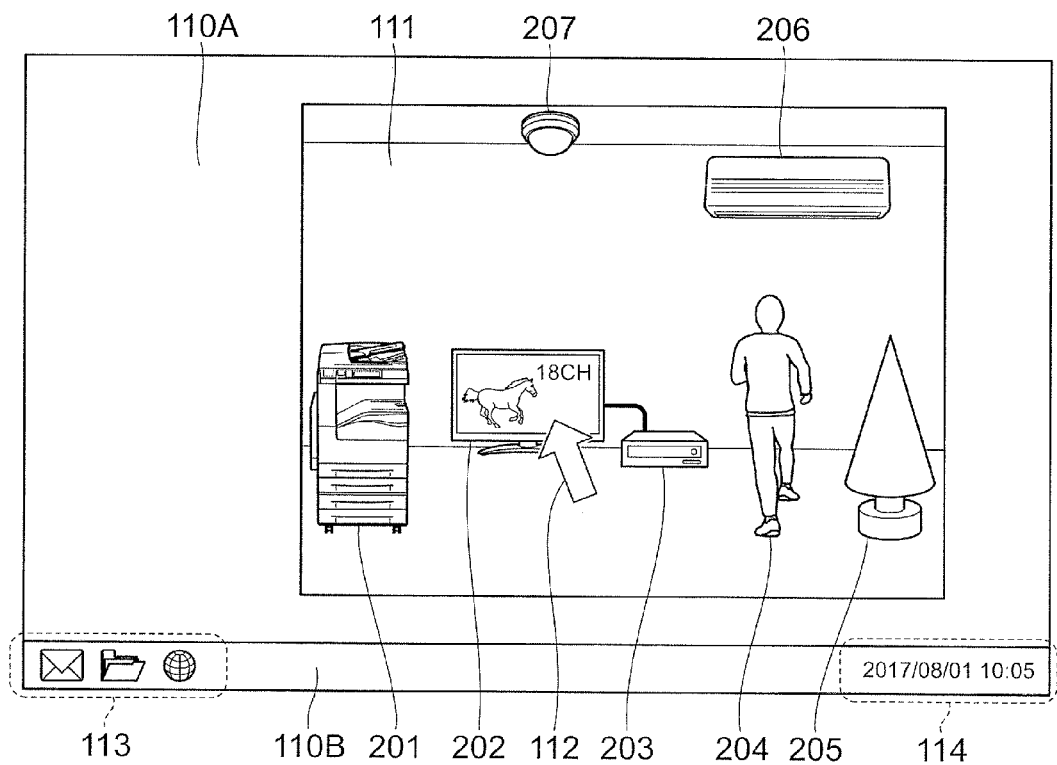
FIGS. 8A and 8B are views illustrating an example of a workflow process according to a first use mode.
Figure 8B:
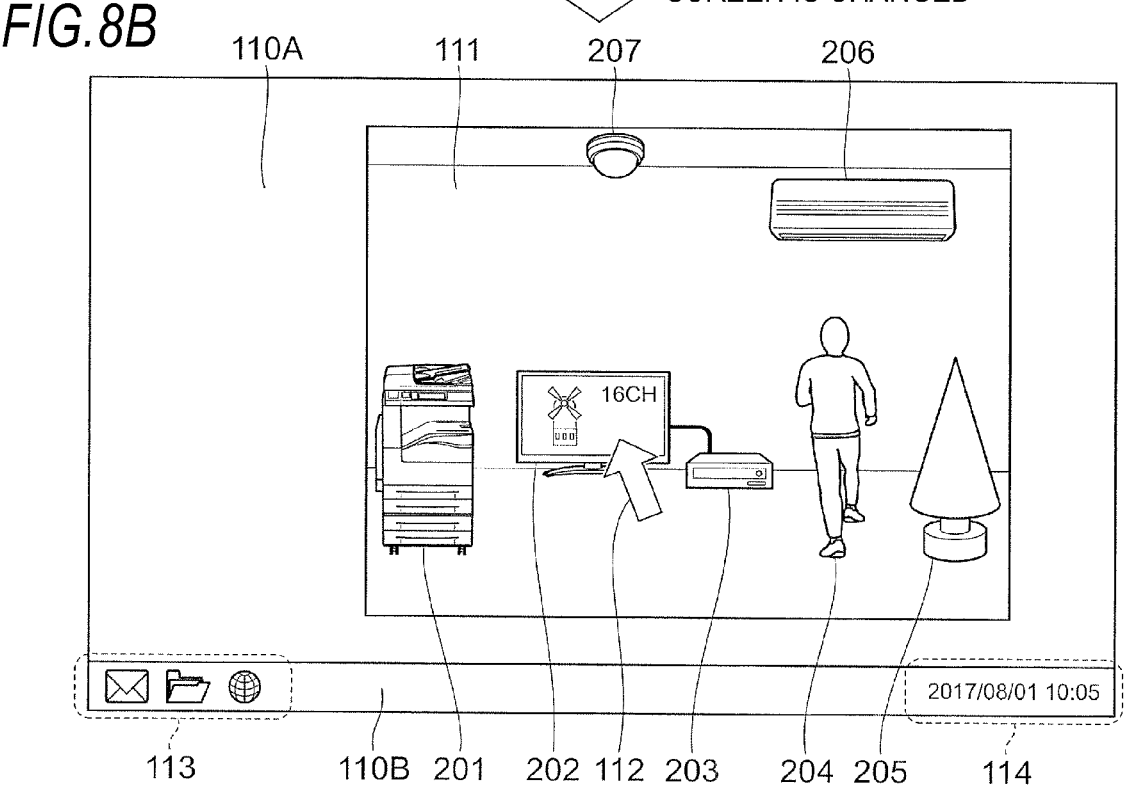

FIGS. 8A and 8B are views illustrating an example of the workflow process according to a first use mode. FIG. 8A illustrates the display state of the still image 111 until one of images is selected, and FIG. 8B illustrates the display state of the still image 111 after one of the images is selected.

In the case of FIGS. 8A and 8B, a mouse pointer 112 is positioned over the image 202 of the display device.

In this state, when the mouse (not illustrated) is left-clicked and the position of the mouse pointer 112 is specified, the computer 110 (see FIG. 2) operates the workflow process defined by the information 13A corresponding to the specified position of the mouse pointer 112.

Next, the computer 110 requests a notification of a current operation situation by designating, as a destination, the real display device 152 (see FIG. 2) associated with the image 202 of the display device specified in the still image 111 (which is managed as an object in the attribute information 16).

This request is implemented, for example, by communication on the IoT network. In this example, the display device 152 sends, to the computer 110, notifications indicating that the power of the current display device 152 is on, that a program of Channel 16 is being displayed, and so on.

Upon receiving the notification of the operation status of the display device 152, the computer 110 changes the contents of the image 202 of the display device in the still image 111 from Channel 18 to Channel 16. In the example illustrated in FIGS. 8A and 8B, the contents of the display screen and the channel number are changed.

The display screen displayed after the change may be a fixed image that is prepared in advance for each channel or an image captured from a program which is being broadcast.

These images may be read from the storage unit 132 (see FIG. 4) of the computer 110, acquired from the display device 152 (see FIG. 2), or acquired from the server device 120 (see FIG. 2) that provides services related to the workflow process.

Further, when a tuner used to display the program is built in the computer 110, the tuner may be controlled based on the operation status received from the real display device 152 to generate an image of the program being displayed at the time of the operation.

When the image displayed on the display device 152 is an image reproduced from the recording and reproducing device 153 (see FIG. 2), a captured image may be used by the display device 152.

Alternatively, the screen of the display device 152 may display by text that the current display of the real display device 152 is Channel 16.

By using the function of this use mode, the user may confirm the state of a real article corresponding to each image as a change of an image displayed on the still image 111 through the still image 111 such as an electronic photograph.

Further, when the space appearing in the still image 111 is a private space, it is possible, for example, to collect necessary information by accessing a home network (in-home LAN) through a smart phone or the like and communicating with an IoT device that exists in the home and to change the display according to the current state of the other images appearing in the still image 111.

Second Use Mode

Here, a description will be made of a case where the computer 110 (see FIG. 2) communicates with a real device corresponding to an image designated on the still image 111 to display a notification screen that prompts the user to perform a specific action based on information acquired from the real device.

Figure 9A:
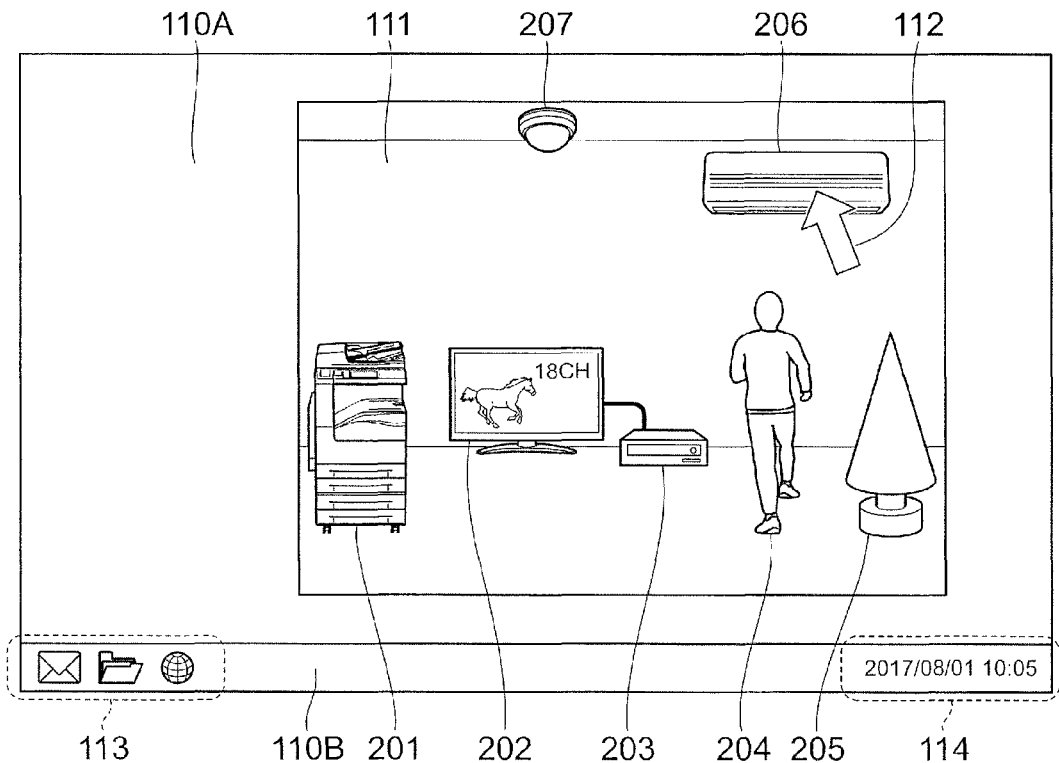
FIGS. 9A and 9B are views illustrating an example of a workflow process according to a second use mode.
Figure 9B:
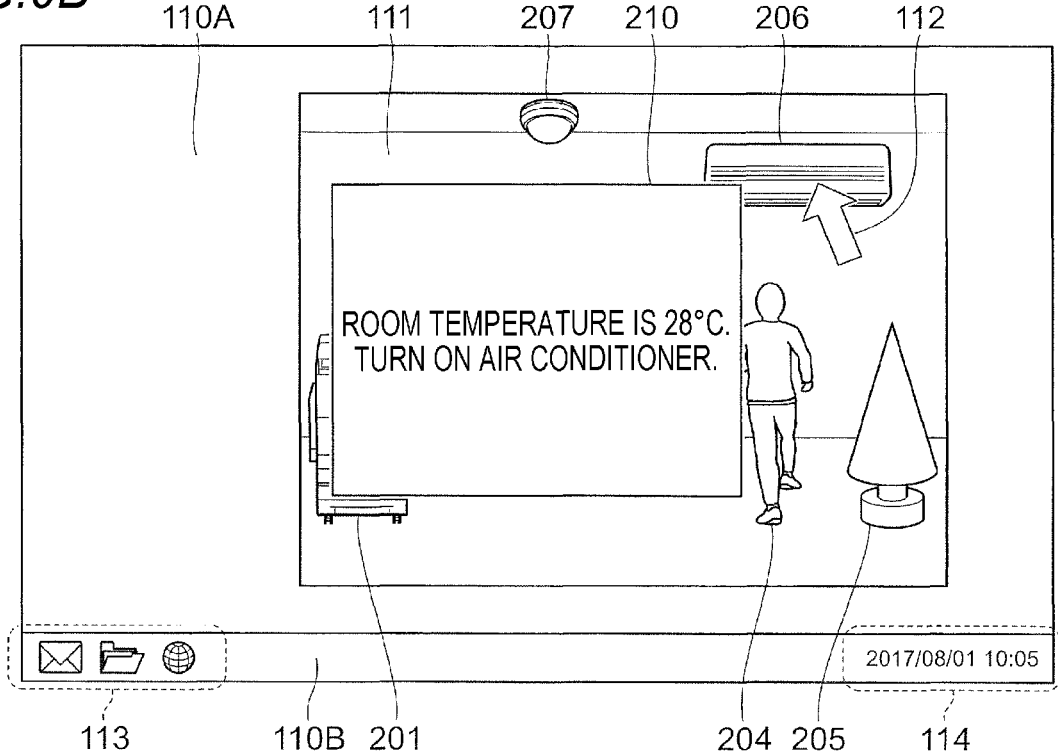

FIGS. 9A and 9B are views illustrating an example of the workflow process according to a second use mode. FIG. 9A illustrates the display state of the still image 111 until one of images is selected, and FIG. 9B illustrates the display state of the still image 111 after one of the images is selected.

In the case of FIGS. 9A and 9B, the mouse pointer 112 is positioned over the image 206 of the air conditioner.

In this state, when the mouse (not illustrated) is left-clicked and the position of the mouse pointer 112 is specified, the computer 110 (see FIG. 2) operates the workflow process defined by the information 13A corresponding to the specified position of the mouse pointer 112.

Next, the computer 110 requests a notification of a current operation situation by designating, as a destination, the real air conditioner 156 (see FIG. 2) associated with the image 206 of the air conditioner (object) specified on the still image 111. This request is implemented, for example, by communication on the IoT network. In this example, the display device 152 sends, to the computer 110, notifications indicating that the power of the air conditioner 156 is off, that room temperature is 28° C., and so on. Here, a temperature sensor is built in the air conditioner.

Upon receiving the notification of the operating situation of the air conditioner 156, the computer 110 compares the acquired room temperature with a preset target temperature and executes a control such that the room temperature becomes the target temperature. In the case of FIGS. 9A and 9B, since the real air conditioner 156 is in the OFF state, a notification screen 210 is displayed, indicating that the current room temperature is 28° C. and that the air conditioner should be turned on in order to lower the room temperature to the target temperature.

Further, when the real air conditioner 156 is turned on, a control signal which lowers the set temperature so that the room temperature decreases to the target temperature may be transmitted from the computer 110 to the air conditioner 156 without the notification screen 210 being displayed on the still image 111 in a superimposed manner.

The target temperature may be stored as a part of the information 13A or may be specified in the program on the computer 110 side (an application program operating in cooperation with the workflow process specified in the information 13A). The application program is executed by the computer 110.

Figure 10A:
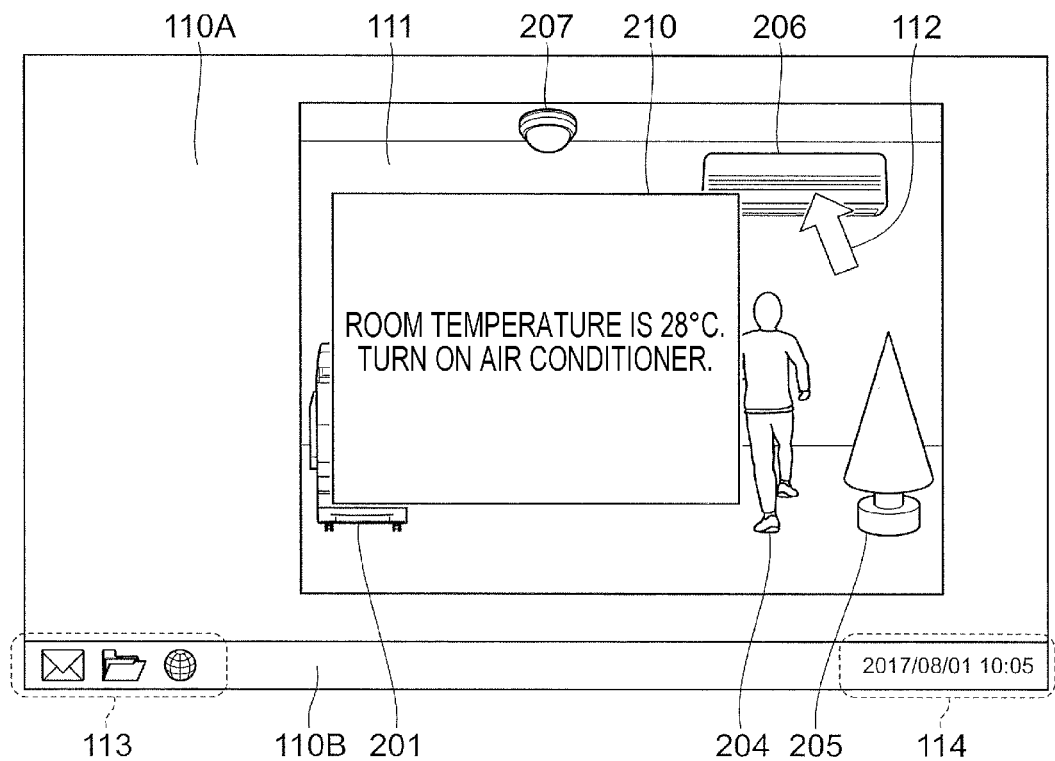
FIGS. 10A and 10B are continued from FIGS. 9A and 9B and are views illustrating the example of the workflow process according to the second use mode.
Figure 10B:
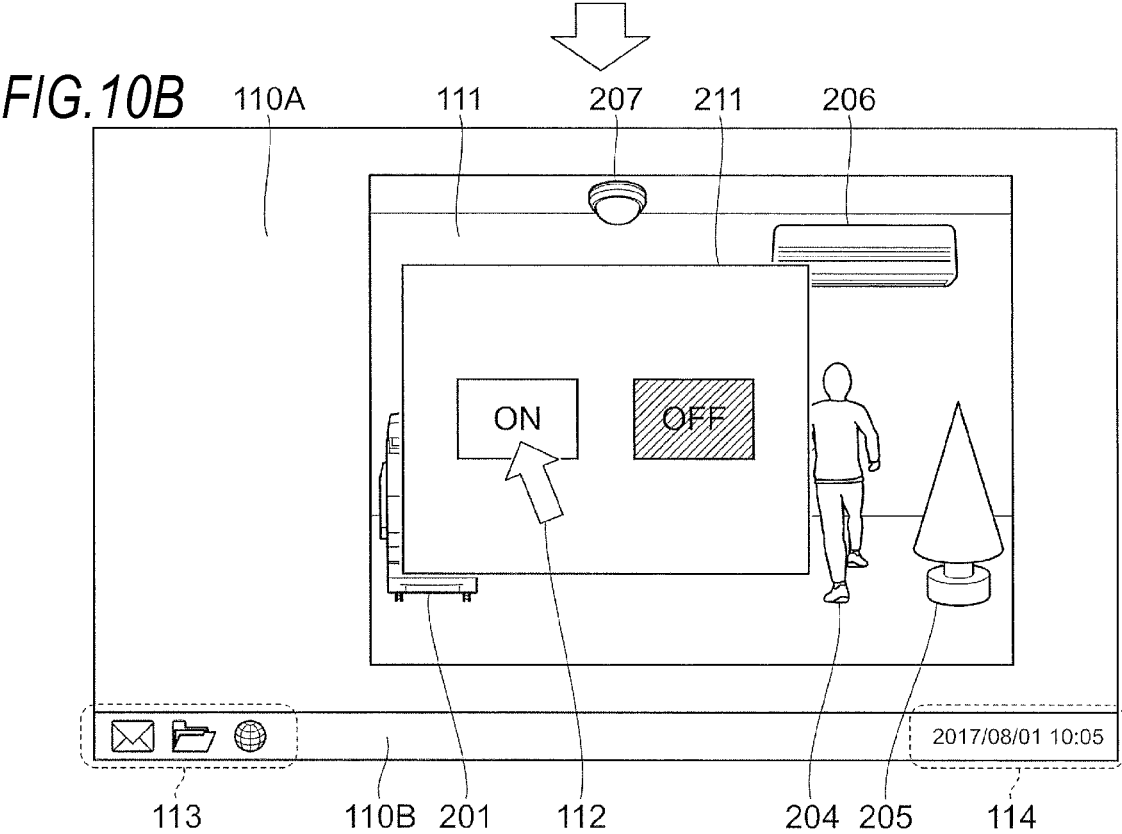

FIGS. 10A and 10B are continued from FIGS. 9A and 9B and are views illustrating the example of the workflow process according to the second use mode. FIG. 10A illustrates a state in which the notification screen 210 is displayed, and FIG. 10B illustrates a state in which an operation screen 211 is displayed.

FIG. 10B illustrates a state where among the ON button and the OFF button, the ON button is selected in the mouse pointer 112. Also, a screen for inputting the set temperature or the target temperature may be displayed.

In the case of FIGS. 10A and 10B, since the operation screen 211 is displayed during the workflow process which is executed in response to the designation of the image 206 of the air conditioner on the still image 111, the air conditioner 156 may be operated from a remote place while the room temperature at the time of operation is confirmed.

The operation screen 211 is an example of a screen for operating a function of a device.

Further, in the example of FIGS. 10A and 10B, it is assumed that the room temperature is high, but the second use mode may also be used when the room temperature is low.

Also, in FIGS. 9A and 9B and FIGS. 10A and 10B, when the user has designated the image 206 of the air conditioner among the objects appearing in the still image 111, the notification screen 210 and the operation screen 211 are displayed based on the room temperature information acquired from the real air conditioner 156. In addition, the control signal may be transmitted to other devices (for example, fans) associated with air conditioning, based on the acquired room temperature information.

Subsequently, another use method will be described.

Figure 11A:
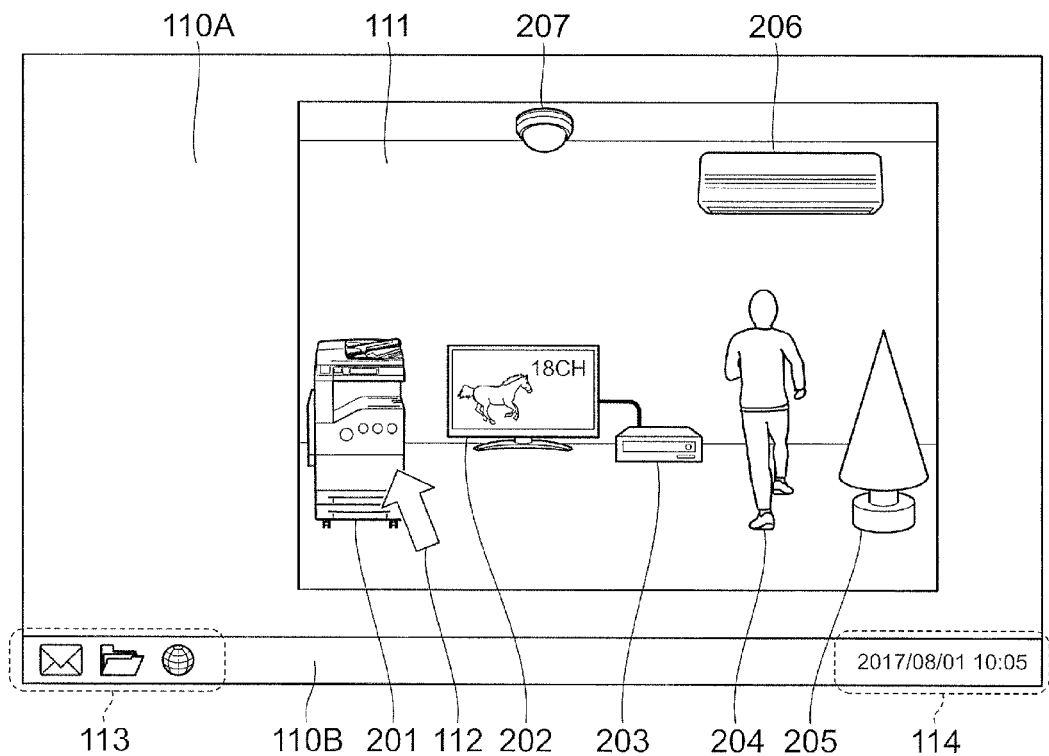
FIGS. 11A and 11B are views illustrating another example of the workflow process according to the second use mode.
Figure 11B:
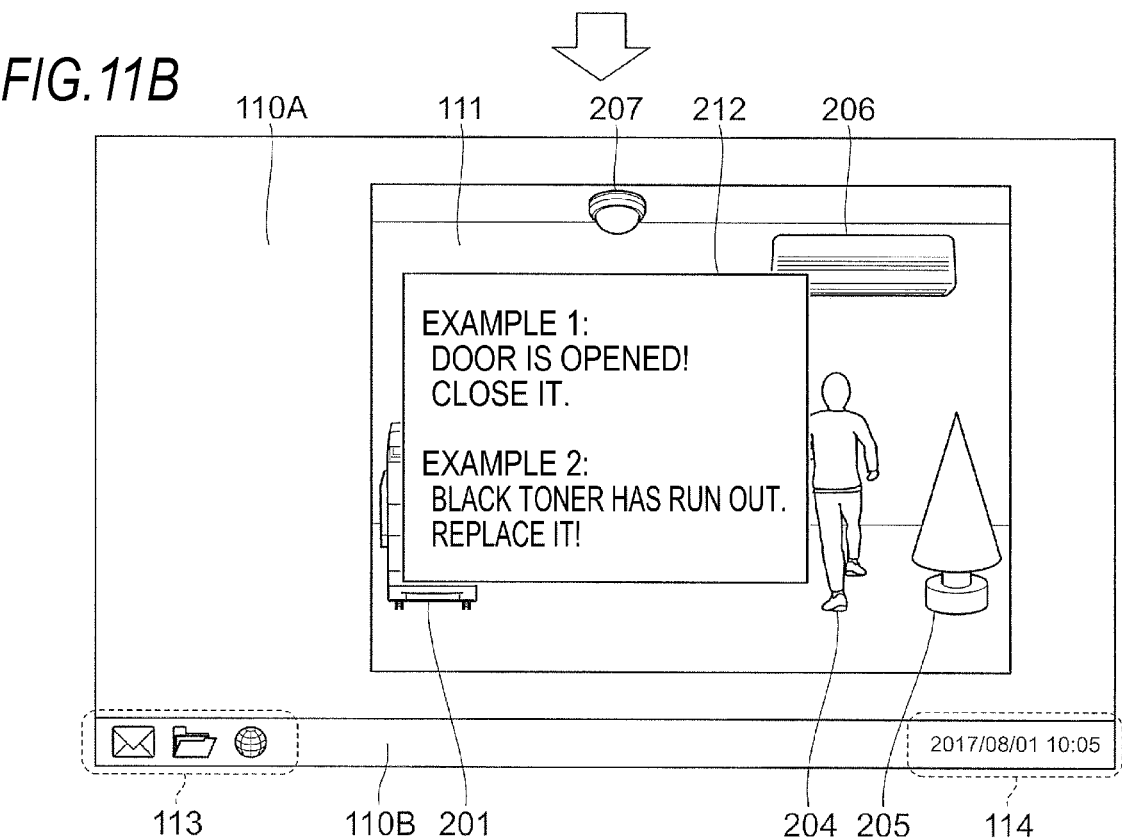

FIGS. 11A and 11B are views illustrating another example of the workflow process according to the second use mode. FIG. 11A illustrates the display state of the still image 111 after one of the images is selected, and FIG. 11B illustrates another display example of the notification screen.

In the example of FIGS. 11A and 11B, the state after the image 201 of the image forming device is changed according to the state of the real image forming device 151 is illustrated. Specifically, FIGS. 11A and 11B illustrate that the image forming device 201 is in the state where the front door of the image forming device 201 is opened and the inside of the image forming device 201 can be checked.

In this case, the operation screen 110A displays, for example, a notification screen 212 indicating that the door is opened and the door should be closed and/or a notification screen 212 indicating that a black toner has run out and the black toner should be replaced.

Further, when a mechanism capable of closing the door by a remote operation is provided in the image forming device 151, a signal for closing the door may be output under the control of the computer 110 or a signal for ordering the black toner may be transmitted to a provider registered in advance.

Third Use Mode

In the above-described first and second use modes, the image (object) designated on the still image 111 is an image of a device having a communication function. However, in reality, all of the objects do not have a communication function.

Then, in a third use mode, a description will be made of a case where a real article corresponding to the image (object) designated on the still image 111 does not have a communication function.

Figure 12A:
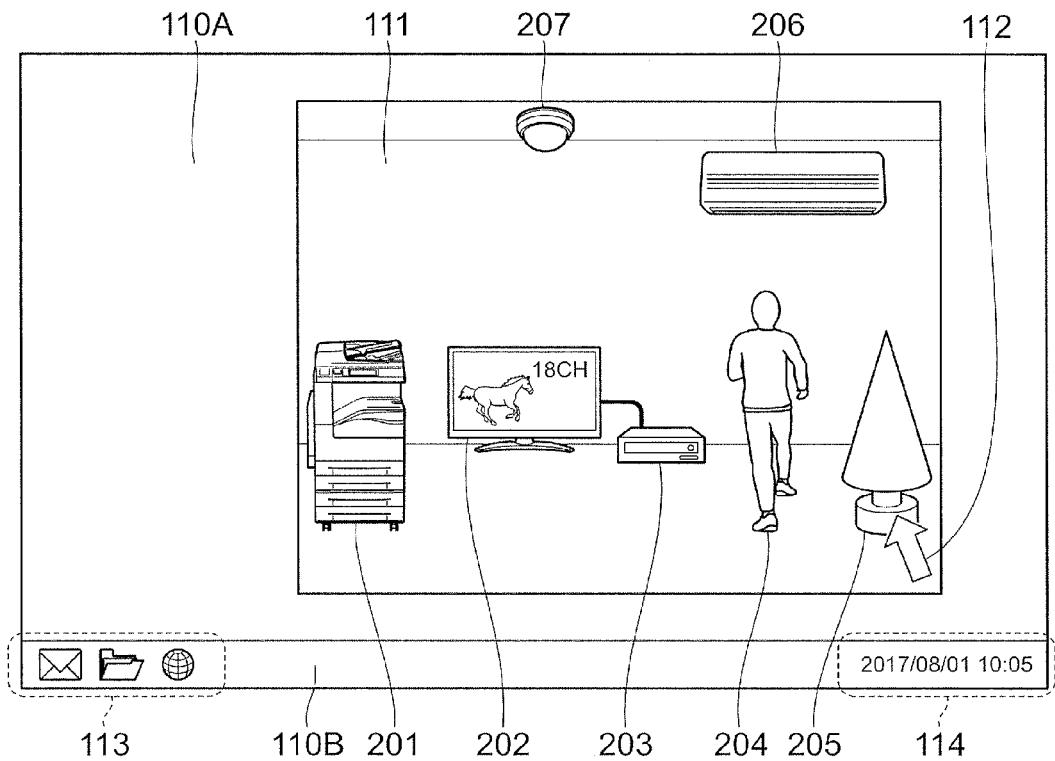
FIGS. 12A and 12B are views illustrating an example of a workflow process according to a third use mode.
Figure 12B:
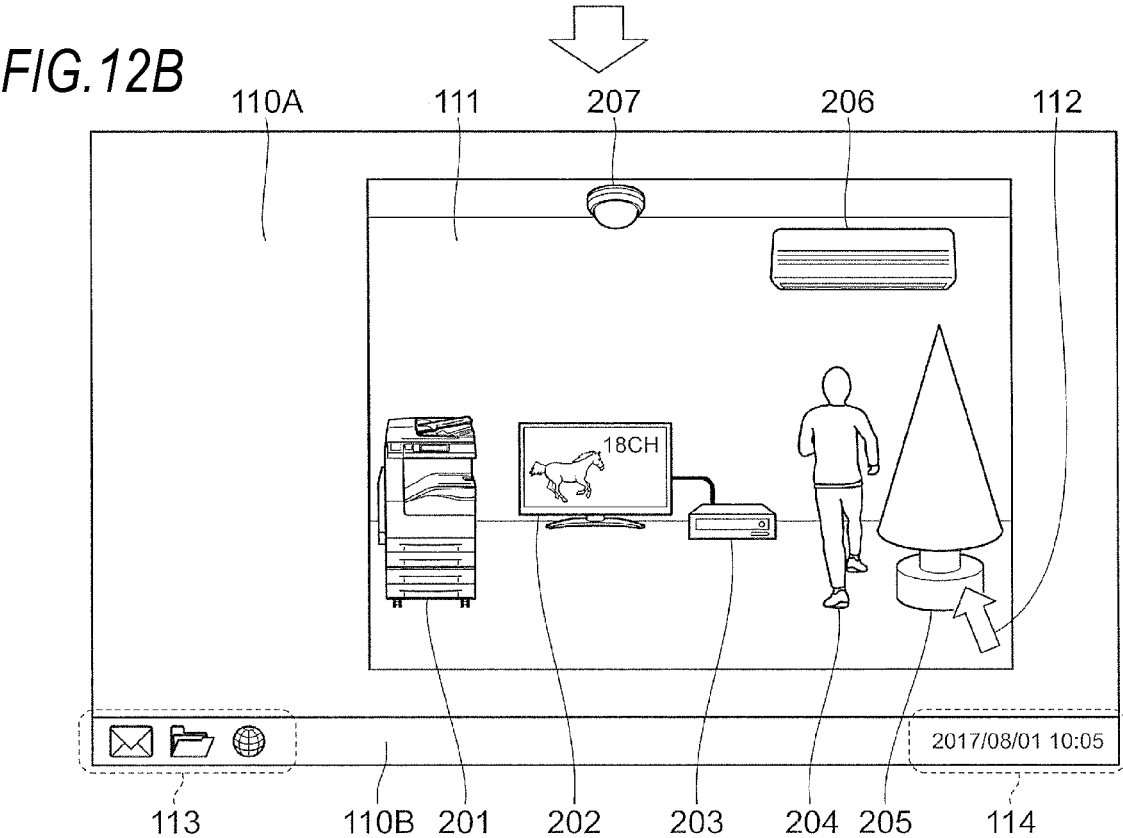

FIGS. 12A and 12B are views illustrating an example of the workflow process according to the third use mode. FIG. 12A illustrates the display state of the still image 111 until one of images is selected, and FIG. 12B illustrates the display state of the still image 111 after one of the images is selected.

In the case of FIGS. 12A and 12B, the mouse pointer 112 is positioned over the image 205 of a planted tree.

In this state, when the mouse (not illustrated) is left-clicked and the position of the mouse pointer 112 is specified, the computer 110 (see FIG. 2) operates the workflow process defined by the information 13A corresponding to the specified position of the mouse pointer 112.

In this example, the image 205 of the planted tree is designated, and the planted tree does not have a communication function. Therefore, unlike the first and second exemplary embodiments, it is impossible to communicate with the object designated by the mouse pointer 112.

In such a case, an article other than the image may be registered as a communication target in advance, and the real space information may be acquired.

In the case of FIGS. 12A and 12B, the surveillance camera 157 (see FIG. 2) is recorded as a communication destination in the information 13A corresponding to the image 205 of the planted tree. Therefore, the computer 110 acquires a current image of the planted tree 155 (see FIG. 2) through communication with the surveillance camera 157.

The computer 110 processes the acquired image to change the display of the image 205 of the planted tree on the still image 111 according to the current status of the actual planted tree 155.

In the example of FIG. 12B, a state in which the planted tree has grown more than when the still image 111 is captured is illustrated. For example, an image obtained by enlarging the image 205 of the planted tree on the still image 111 by image processing is displayed.

Further, the image is not necessarily an actual image because it is only necessary to show that the planted tree has grown. For example, the current state may be displayed in a text sentence. A sample image at a stage similar to the growth stage recognized by image processing may be read from a database or the like, for the replacement.

In addition, information on the contents and timing of trimming depending on the growth stage recognized in the image processing, attention points at the time of trimming, harvest timing, and the like may be displayed.

The soil image of the planted tree 155 (see FIG. 2) may be extracted from the images captured by the surveillance camera 157 (see FIG. 2) so as to analyze the dryness of the soil.

Figure 13A:
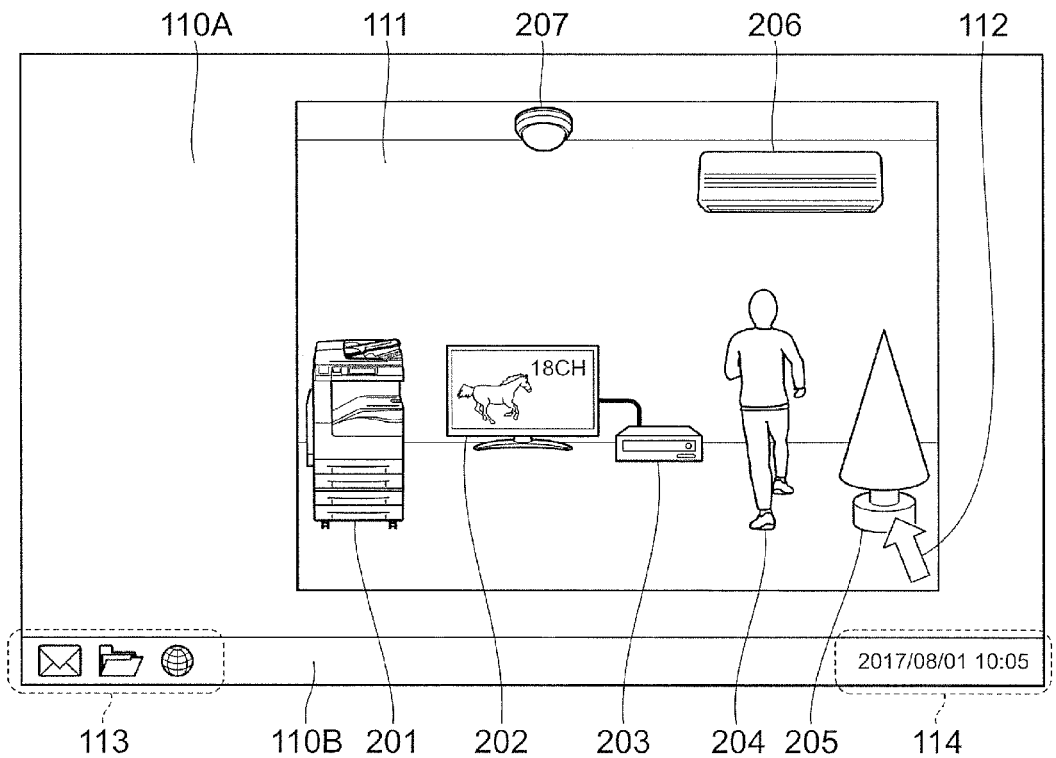
FIGS. 13A and 13B are views illustrating another example of the workflow process according to the third use mode.
Figure 13B:
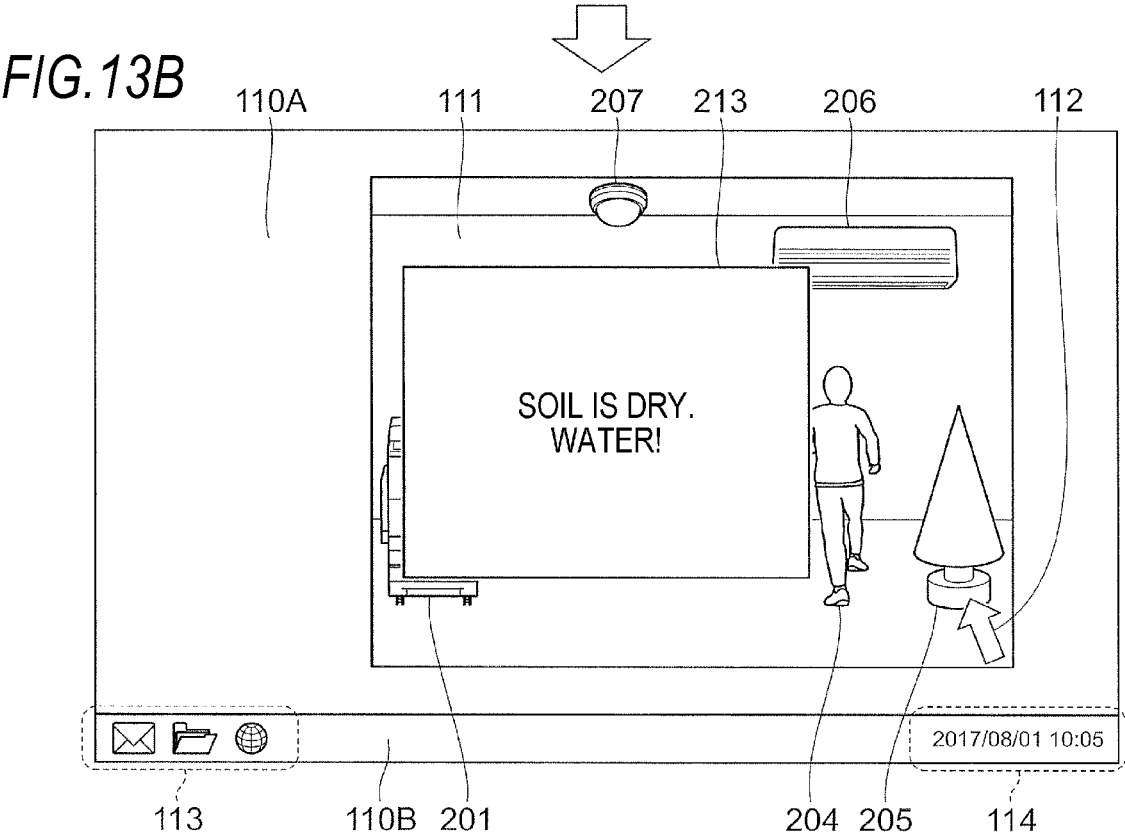

FIGS. 13A and 13B are views illustrating another example of the workflow process according to the third use mode. FIG. 13A illustrates the display state of the still image 111 until one of images is selected, and FIG. 13B illustrates the display state of the still image 111 after one of the images is selected.

In FIG. 13B, a notification screen 213 is displayed indicating that soil is dry and should be watered.

Further, in this use mode, the surveillance camera 157 is registered as a communication destination for the image 205 of the planted tree. However, a humidity sensor plugged into the soil of the planted tree 155 may be registered as the communication destination. In this case, the computer 110 is notified of the value of the humidity measured by the humidity sensor. By using the humidity sensor as the communication destination, the drying condition of the soil may be confirmed with higher accuracy compared to a case where the dry condition of the soil is determined using the surveillance camera 157.

Fourth Use Mode

Here, the workflow process when plural objects are designated on the still image 111 will be described.

Figure 14A:
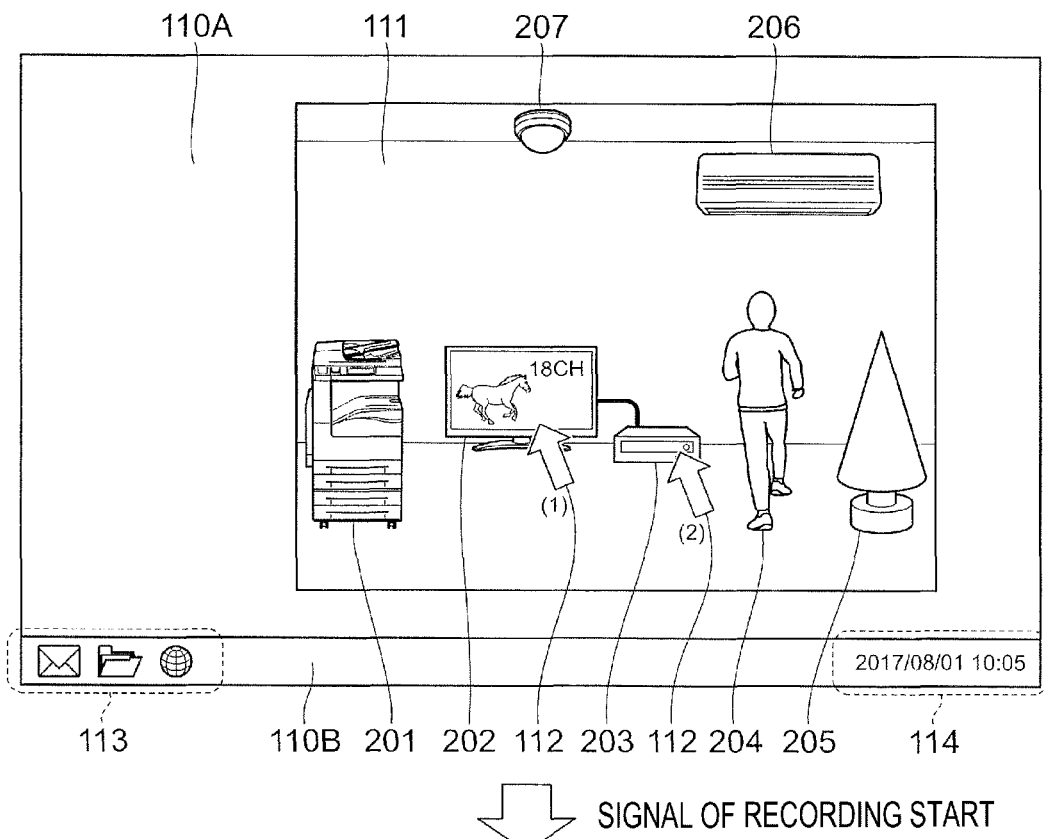
FIGS. 14A and 14B are views illustrating an example of a workflow process according to a fourth use mode.
Figure 14B:
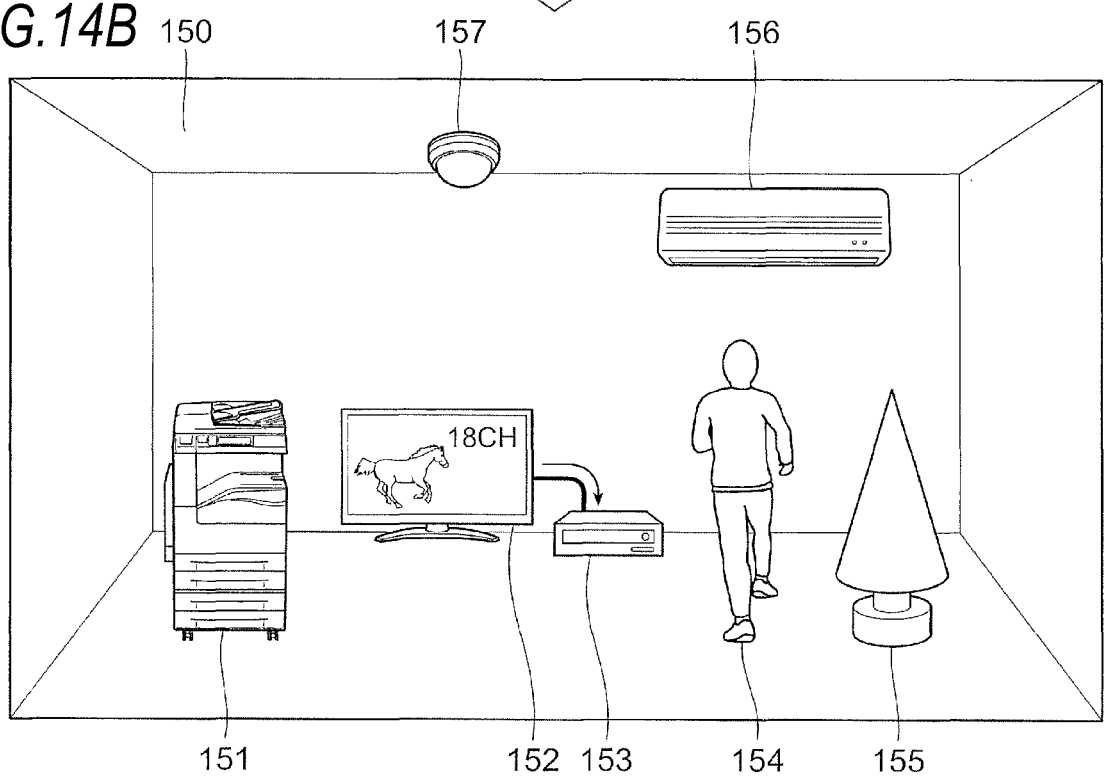

FIGS. 14A and 14B are views illustrating an example of the workflow process according to a fourth use mode. FIG. 14A illustrates a state in which two images are sequentially selected on the still image 111, and FIG. 14B illustrates an operation situation in a real space.

In FIGS. 14A and 14B, it is assumed that the image 202 of the display device and the image 203 of the recording and reproducing device are sequentially clicked. In this case, the computer 110 (see FIG. 2) reads, from the attribute information 16, the information 13A corresponding to the case where the image 202 of the display device is firstly clicked and the image 203 of the recording and reproducing device is secondly clicked, and determines control operations for the real display device 152 and the recording and reproducing device 153 in consideration of the real space information.

Specifically, an instruction to record the broadcast program being displayed on the display device 152 in the real space in the recording and reproducing device 153 is output from the computer 110 to the recording and reproducing device 153 (see FIG. 2). For example, the computer 110 acquires the program information of a source (tuner) and a channel (Channel 18) of the image being displayed through communication with the display device 152 and instructs the recording and reproducing device 153 to record the program which is being broadcast.

Figure 15A:
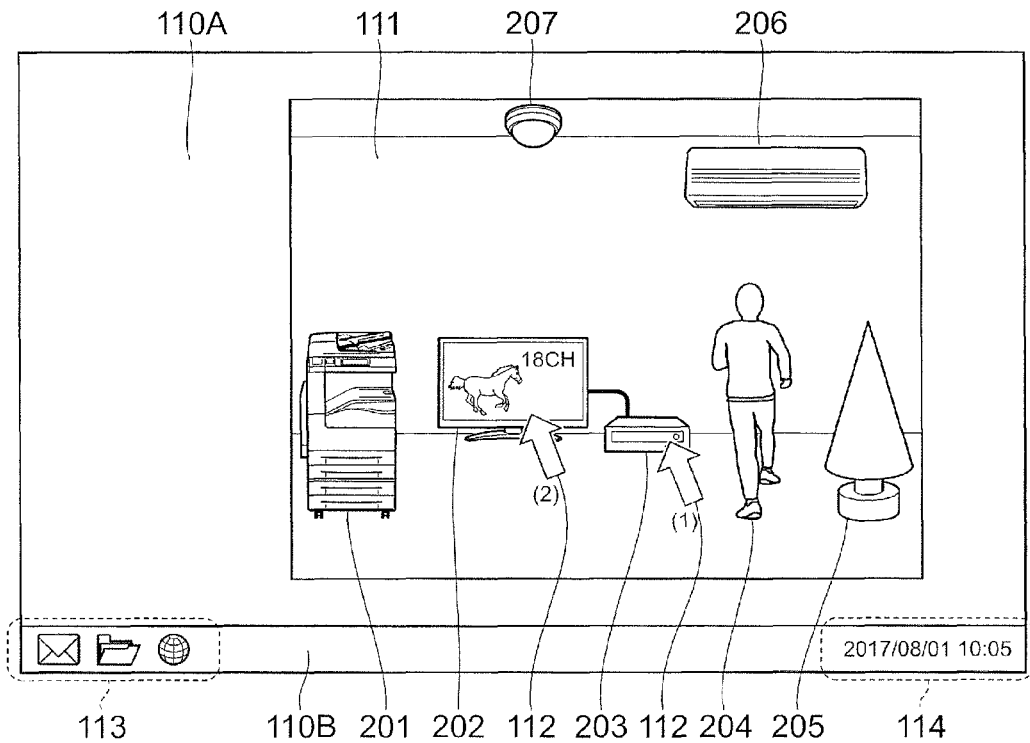
FIGS. 15A and 15B are views illustrating another example of the workflow process according to the fourth use mode.
Figure 15B:
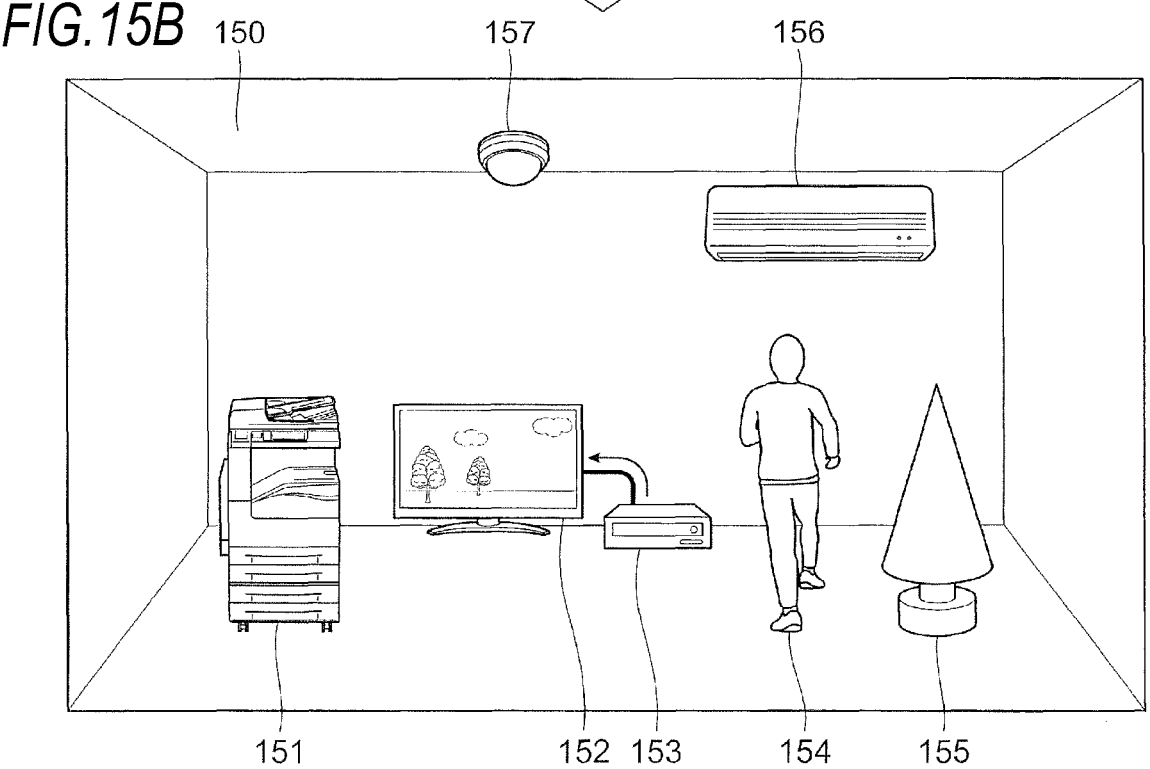

FIGS. 15A and 15B are views illustrating another example of the workflow process according to the fourth use mode. FIG. 15A illustrates a state in which two images are sequentially selected on the still image 111, and FIG. 15B illustrates an operation situation in a real space.

In the case of FIGS. 15A and 15B, the image 202 of the display device and the image 203 of the recording and reproducing device are also clicked. It should be noted that the order of the clicks is reversed. That is, it is assumed that after the image 203 of the recording and reproducing device is clicked, the image 202 of the display device is clicked.

In this case, the computer 110 (see FIG. 2) reads, from the attribute information 16, the information 13A corresponding to a case where the image 203 of the recording and reproducing device is firstly clicked and the image 202 of the display device is secondly clicked, and determines the control operation with respect to the real display device 152 and the recording and reproducing device 153 in consideration of the real space information.

Specifically, instructions to reproduce an image by the recording and reproducing device 153 and to display the reproduced image on the display device 152 are output from the computer 110 (see FIG. 2) to the display device 152 and the recording and reproducing device 153. For example, the computer 110 instructs switching of an image to be displayed through communication with the display device 152, and instructs the recording and reproducing device 153 to reproduce the image. At this time, an operation screen for selecting an image to be reproduced by the recording and reproducing device 153 is displayed on the still image 111.

Further, the workflow process defined in the information 13A is not necessarily associated with the order of clicked devices, but may be associated with a combination of the clicked devices.

When images corresponding to plural devices are designated on the still image 111 as in this use mode, a cooperating operation based on the real space information acquired from the plural real devices may be controlled.

Fifth Use Mode

In the fourth use mode, the description has been made of the workflow process in the case where images of plural objects are designated. The contents of the workflow process may be different depending on which portions of the objects are clicked.

Figure 16A:
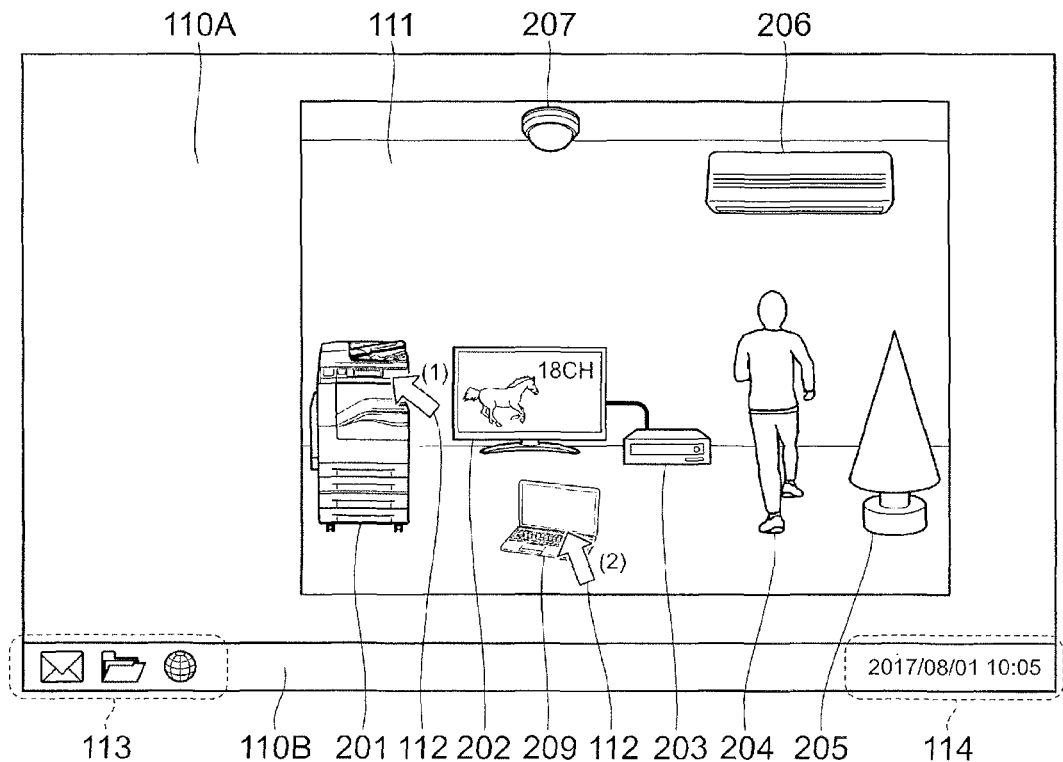
FIGS. 16A and 16B are views illustrating an example of a workflow process according to a fifth use mode.
Figure 16B:
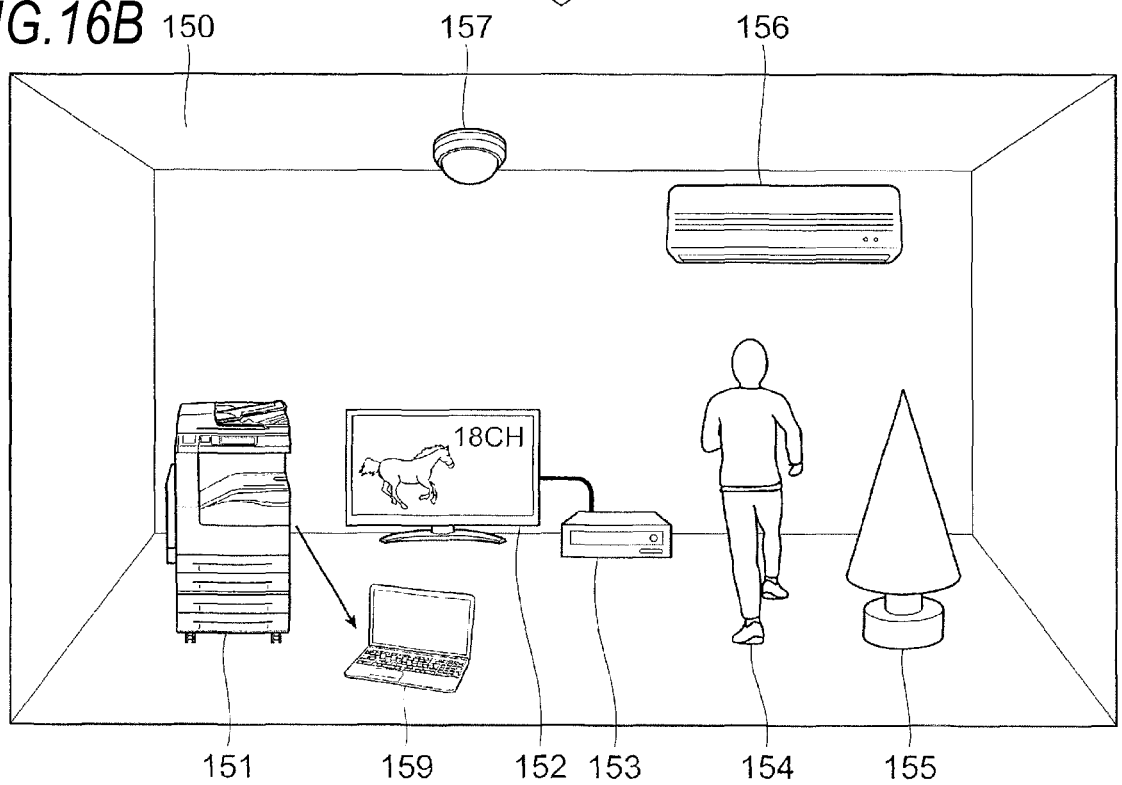

FIGS. 16A and 16B are views illustrating an example of the workflow process according to a fifth use mode. FIG. 16A illustrates a state in which two images are sequentially selected on the still image 111, and FIG. 16B illustrates an operation situation in a real space.

In the case of FIG. 16A, the image 201 of the image forming device and the image 209 of the computer are sequentially clicked. That is, the image 209 of the computer is clicked after the image 201 of the image forming device is clicked.

The mouse pointer 112 in FIG. 16A is located over an image reading unit (a portion of a scanner) of the image 201 of the image forming device. In this case, the computer 110 (see FIG. 2) instructs the image forming device 151 and the computer 159 to store the image (scanned image) read by the image reading unit in the computer 159.

Figure 17A:
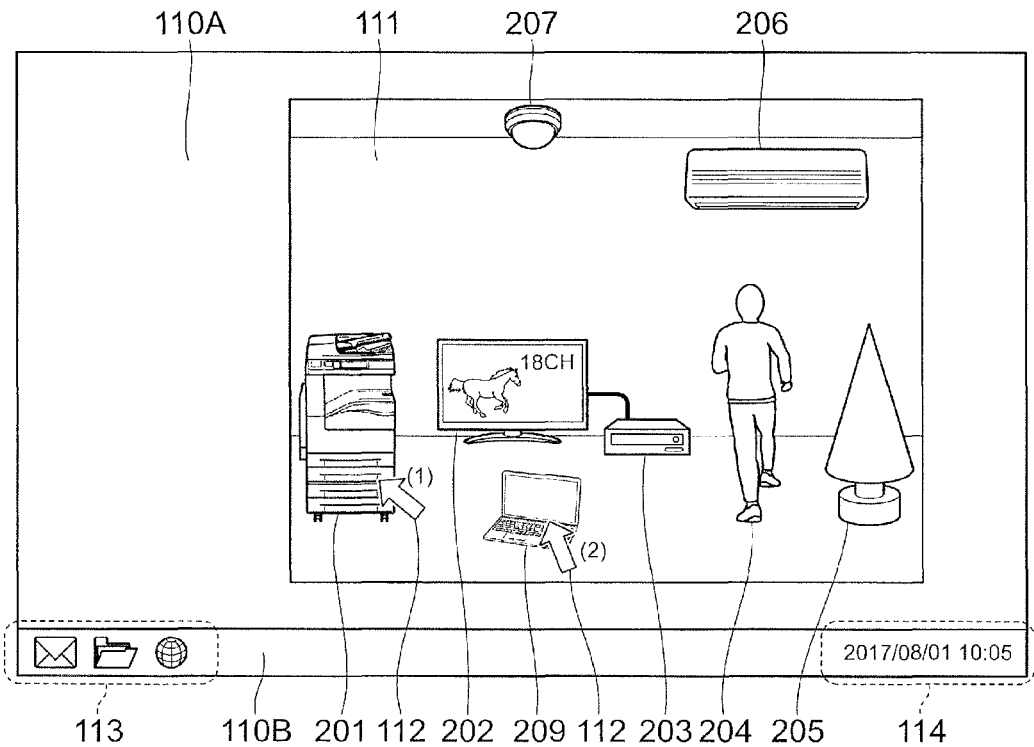
FIGS. 17A and 17B are views illustrating another example of the workflow process according to the fifth use mode.
Figure 17B:
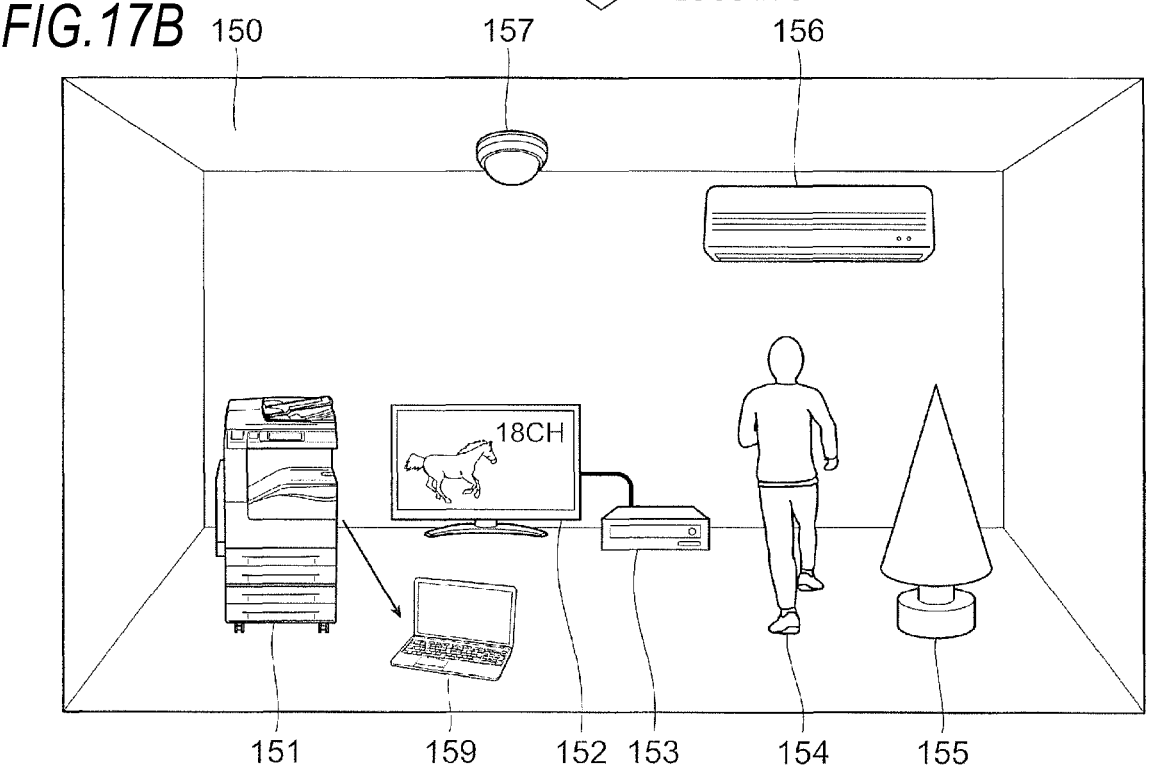

FIGS. 17A and 17B are views illustrating another example of the workflow process according to the fifth use mode. FIG. 17A illustrates a state in which two images are sequentially selected on the still image 111, and FIG. 17B illustrates an operation situation in a real space.

FIGS. 17A and 17B are the same as FIGS. 16A and 16B in that the image 201 of the image forming device and the image 209 of the computer are sequentially clicked. However, the example of FIGS. 17A and 17B is different from the example of FIGS. 16A and 16B in that the mouse pointer 112 is located over the main body portion of the image 201 of the image forming device.

In this case, the computer 110 (see FIG. 2) instructs the image forming device 151 and the computer 159 to output operation logs accumulated in the image forming device 151 to the computer 159.

In this way, it is possible to implement more various workflow processes by imparting meaning not only to an image (object) to be clicked, but also to which portion is clicked.

Figure 18A:
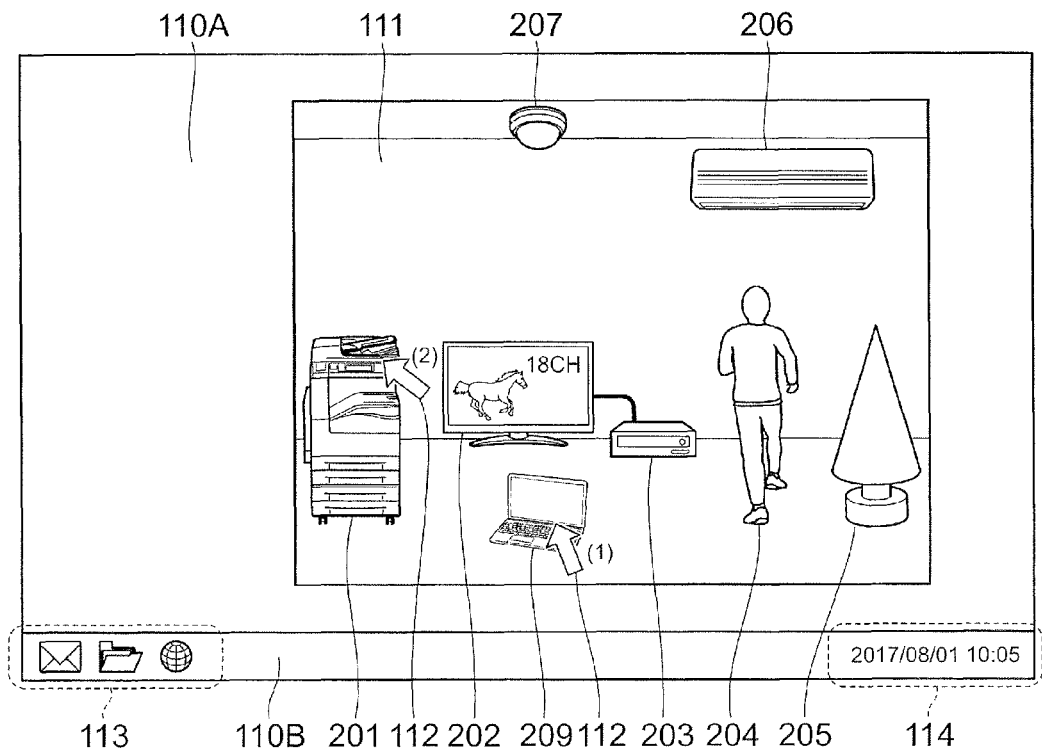
FIGS. 18A and 18B are views illustrating another example of the workflow process according to the fifth use mode.
Figure 18B:
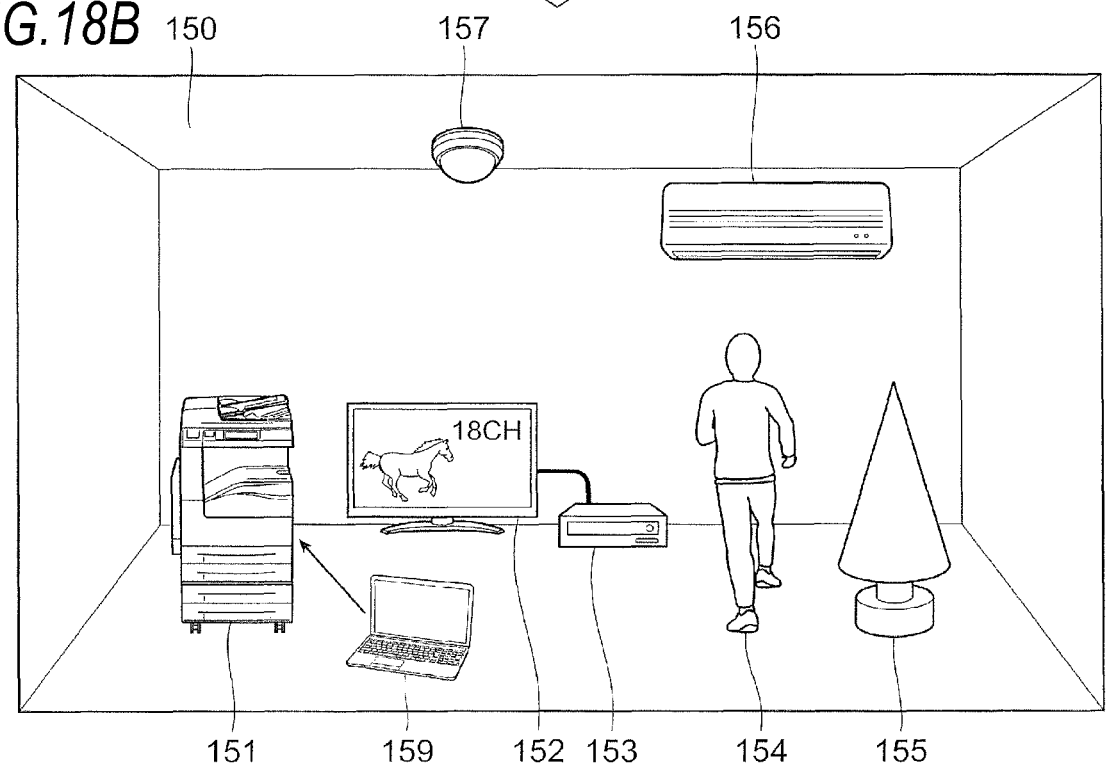

FIGS. 18A and 18B are views illustrating another example of the workflow process according to the fifth use mode. FIG. 18A illustrates a state in which two images are sequentially selected on the still image 111, and FIG. 18B illustrates an operation situation in a real space.

In the case of FIGS. 18A and 18B, the order of clicking the image 201 of the image forming device and the image 209 of the computer is changed from that of FIGS. 16A and 16B. That is, the image 209 of the computer is firstly clicked and the position of the operation panel of the image 201 of the image forming device is secondly clicked.

In this example, facsimile transmission of the images accumulated in the real computer 159 to a destination stored in the operation unit of the image forming device 151 is instructed.

At this time, on the screen of the computer 110 which displays the still image 111, a screen for selecting an image to be facsimile-transmitted as the real space information and/or a screen for selecting destinations accumulated in the image forming device 151 is displayed.

Figure 19A:
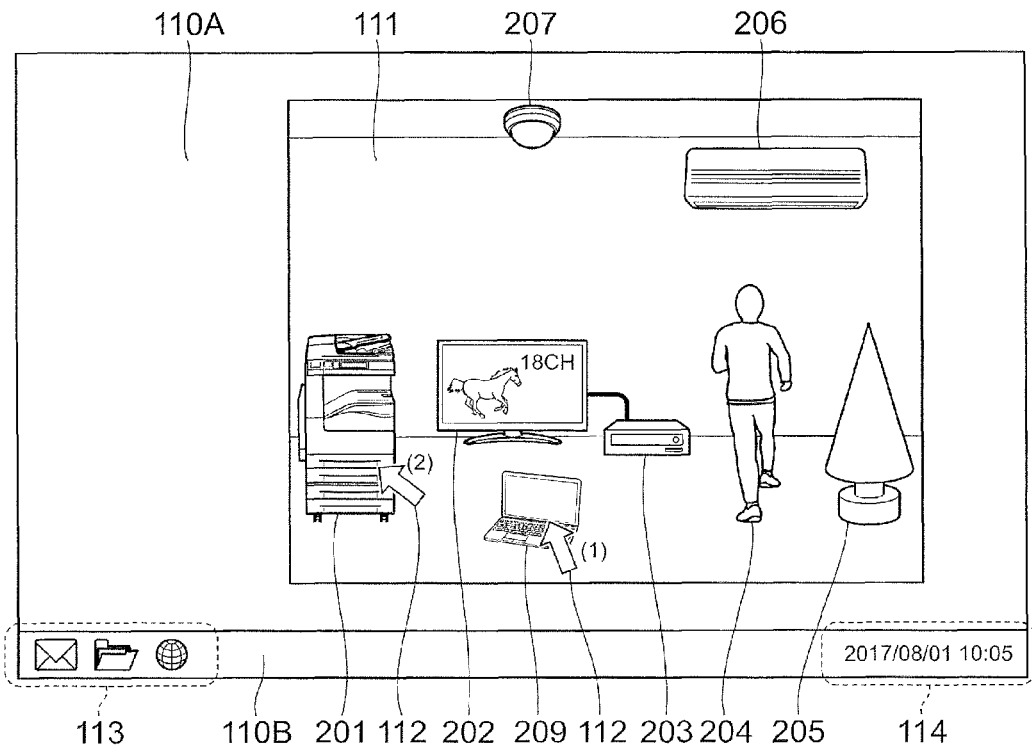
FIGS. 19A and 19B are views illustrating another example of the workflow process according to the fifth use mode.
Figure 19A:
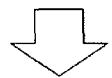
Figure 19B:
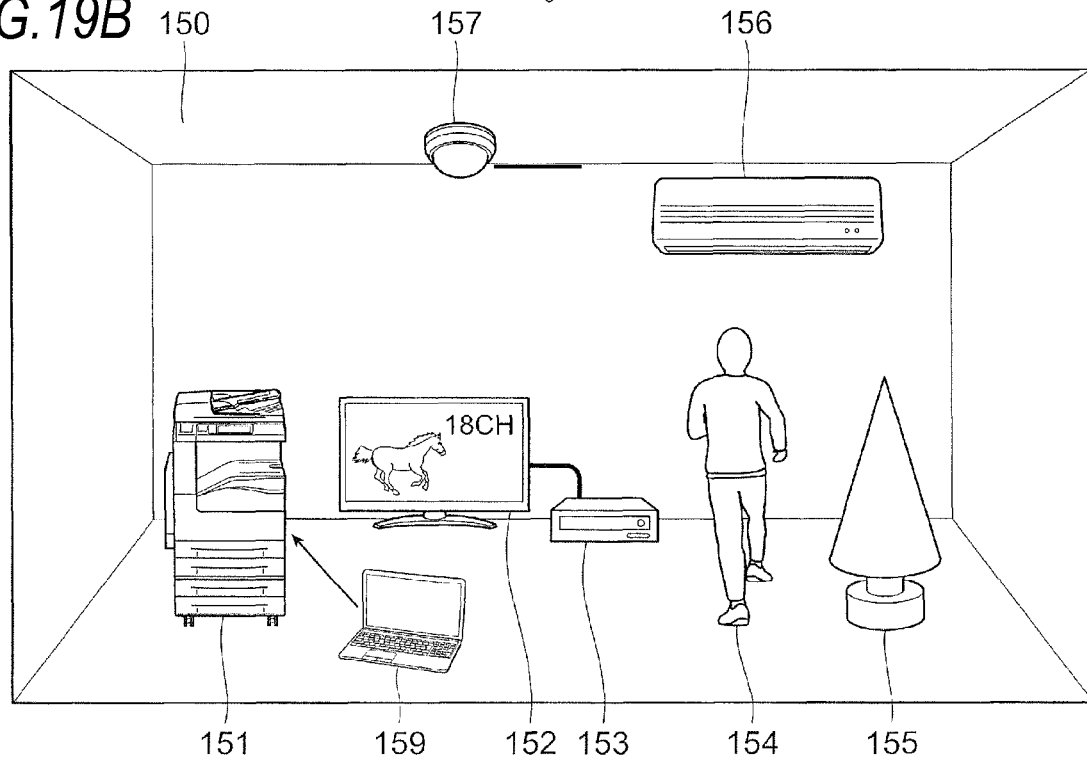

FIGS. 19A and 19B are views illustrating another example of the workflow process according to the fifth use mode. FIG. 19A illustrates a state in which two images are sequentially selected on the still image 111, and FIG. 19B illustrates an operation situation in a real space.

The example of FIGS. 19A and 19B is the same as the example of FIGS. 18A and 18B in that the image 209 of the computer is firstly clicked and the image 201 of the image forming device is secondly clicked. However, FIGS. 19A and 19B illustrate a case where the main body portion of the image 201 of the image forming device is clicked.

In this case, the computer 110 (see FIG. 2) instructs the image forming device 151 and the computer 159 to print the images accumulated in the computer 159 with the image forming device 151. At this time, the still image 111 displays a list of images acquired from the computer 159 in order to select images to be printed.

In this way, when plural objects are registered for one image, the designation of the operation according to not only a clicked image (object) but also to which portion is clicked is performed in response to the operation on the still image 111.

Sixth Use Mode

In the third and fourth use modes described above, the cooperating operations between real devices when plural images (objects) are designated in the still image 111 has been described. It may also be considered that the contents of the cooperating operations are switched to reflect the display state in the still image 111.

Figure 20A:
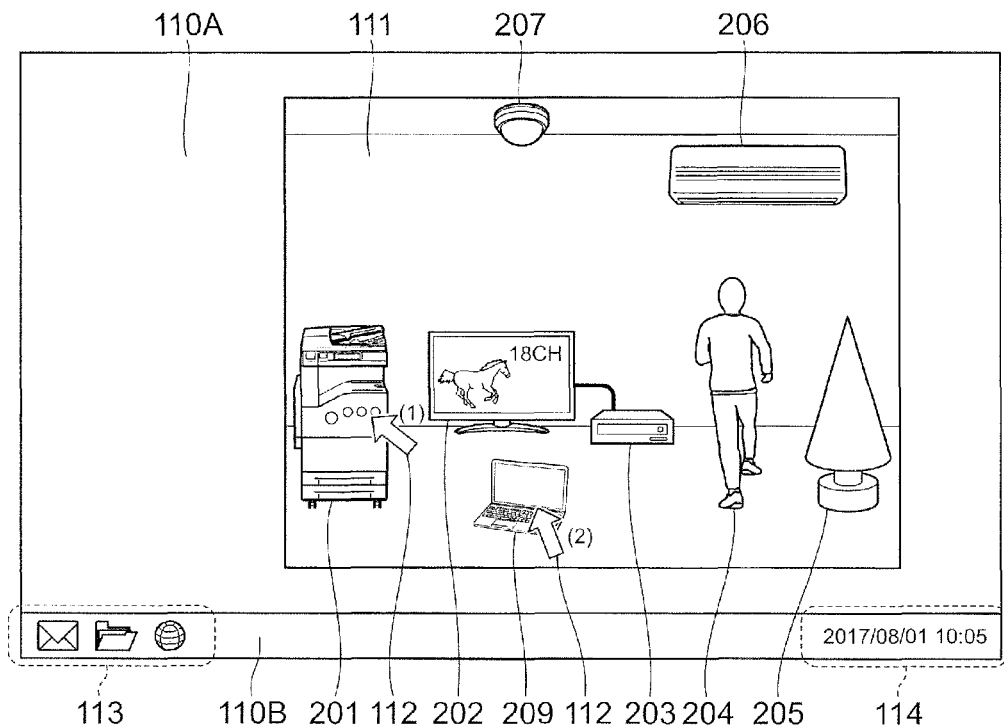
FIGS. 20A and 20B are views illustrating an example of a workflow process according to a sixth use mode.
Figure 20B:
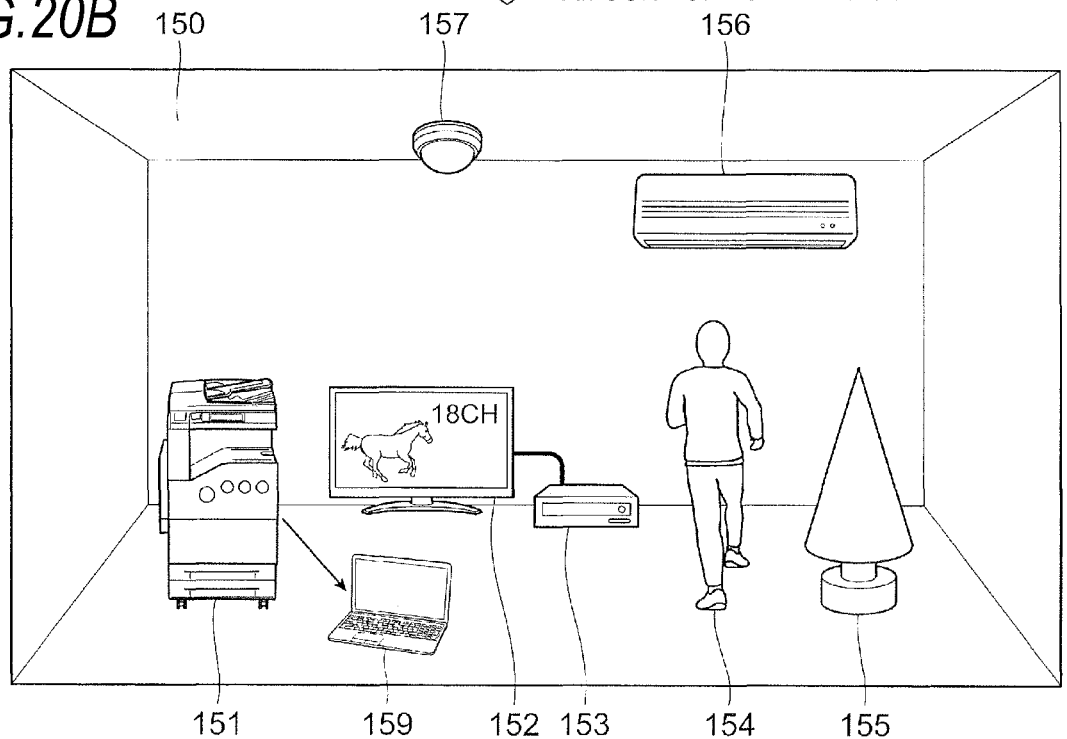

FIGS. 20A and 20B are views illustrating an example of the workflow process according to a sixth use mode. FIG. 20A illustrates a case where two images are sequentially designated in the still image 111 the display of which is changed to reflect the state of the real device, and FIG. 20B illustrates a state of a real space.

In the example of FIGS. 20A and 20B, the display of the image 201 of the image forming device in the still image 111 is changed to an image in which the front door is opened. This display is the same as that in FIGS. 11A and 11B.

Here, the image 209 of the computer is clicked after the front door of the image 201 of the image forming device is opened and the toner portion that may be checked from the outside is clicked.

In this case, the computer 110 determines that a toner container is clicked from a relationship between the information indicating that the front door is opened and the portion where the mouse pointer 112 is located. In this case, the computer 110 executes the information 13A corresponding to a combination of the display states of the clicked devices (in other words, the information acquired from the real image forming device 151, indicating that the front door is opened) and instructs the remaining toner amount to be output to the computer 159.

Further, when the portion in the state where the front door is opened is registered as an object, the information 13A corresponding to the object may be read and the same process may be executed.

Figure 21A:
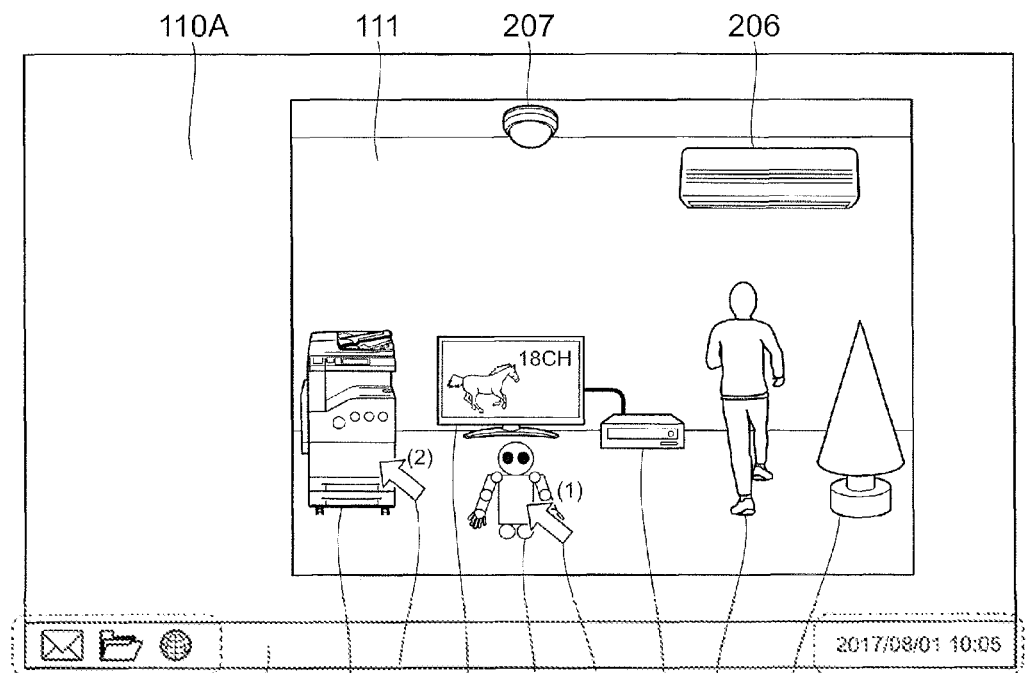
FIGS. 21A and 21B are views illustrating another example of the workflow process according to the sixth use mode.
Figure 21B:
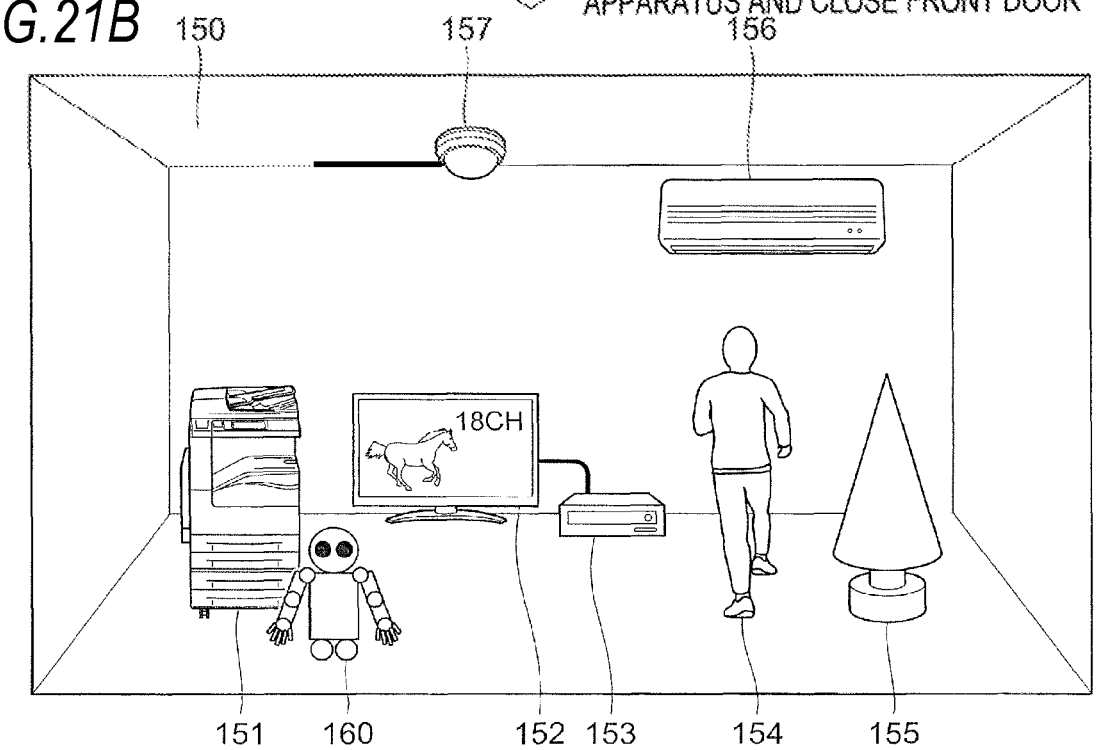

FIGS. 21A and 21B are views illustrating another example of the workflow process according to the sixth use mode. FIG. 21A illustrates a case where two images are sequentially designated in the still image 111 the display of which is changed to reflect the state of the real device, and FIG. 21B illustrates a state of a real space.

In the example of FIGS. 21A and 21B, a state where the display of the image 201 of the image forming device in the still image 111 is changed to an image in which the front door is opened is illustrated.

FIGS. 21A and 21B are different from FIGS. 20A and 20B in that on the still image 111, the image 1210 of an actual robot is firstly clicked and the position of the front door is secondly clicked.

In this case, the computer 110 instructs the robot 160 in the real space 150 to move to the position of the image forming device 151 and to close the front door. Here, the robot 160 includes a self-propelled moving mechanism (for example, a tire, a catapillar, and a mechanism for self-walking), a camera for recognizing a target, a movable arm, and the like.

FIG. 21B illustrates a state after the front door of the image forming device 151 is closed by the robot 160 in the real space 150.

Seventh Use Mode

In the above-described use mode, all the plural images designated on the still image 111 are a combination of devices. However, a designated combination may be a combination of a device and a non-device (for example, a person, a pet, and a planted tree) or a combination of non-devices.

Figure 22A:
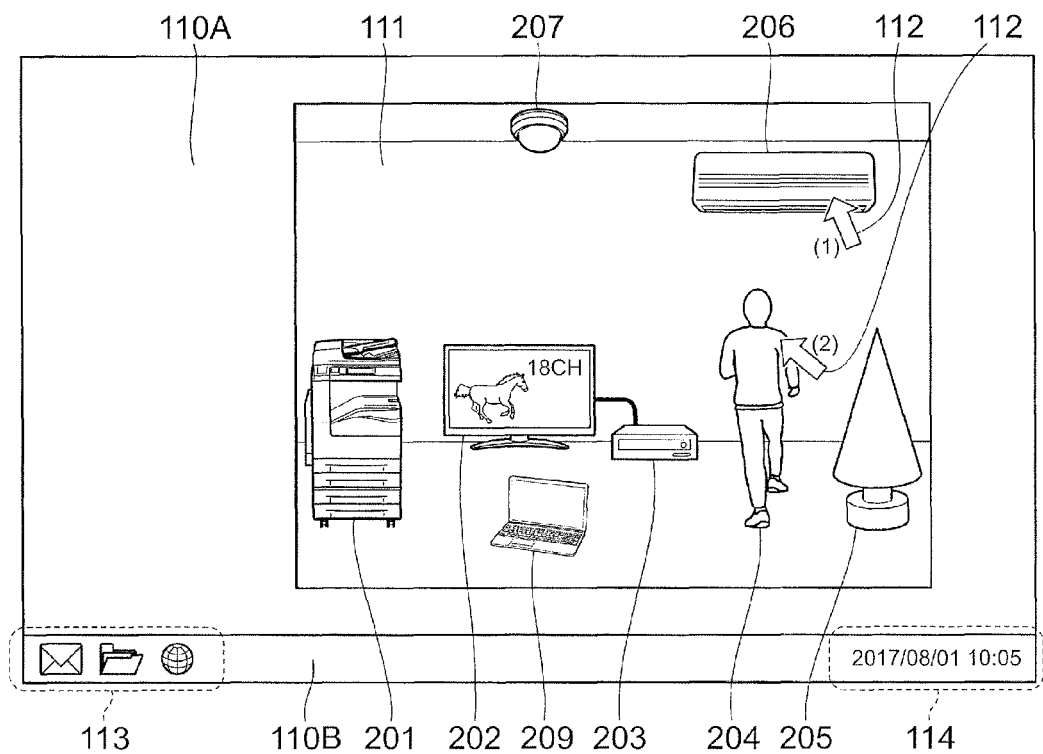
FIGS. 22A and 22B are views illustrating an example of a workflow process according to a seventh use mode.
Figure 22B:
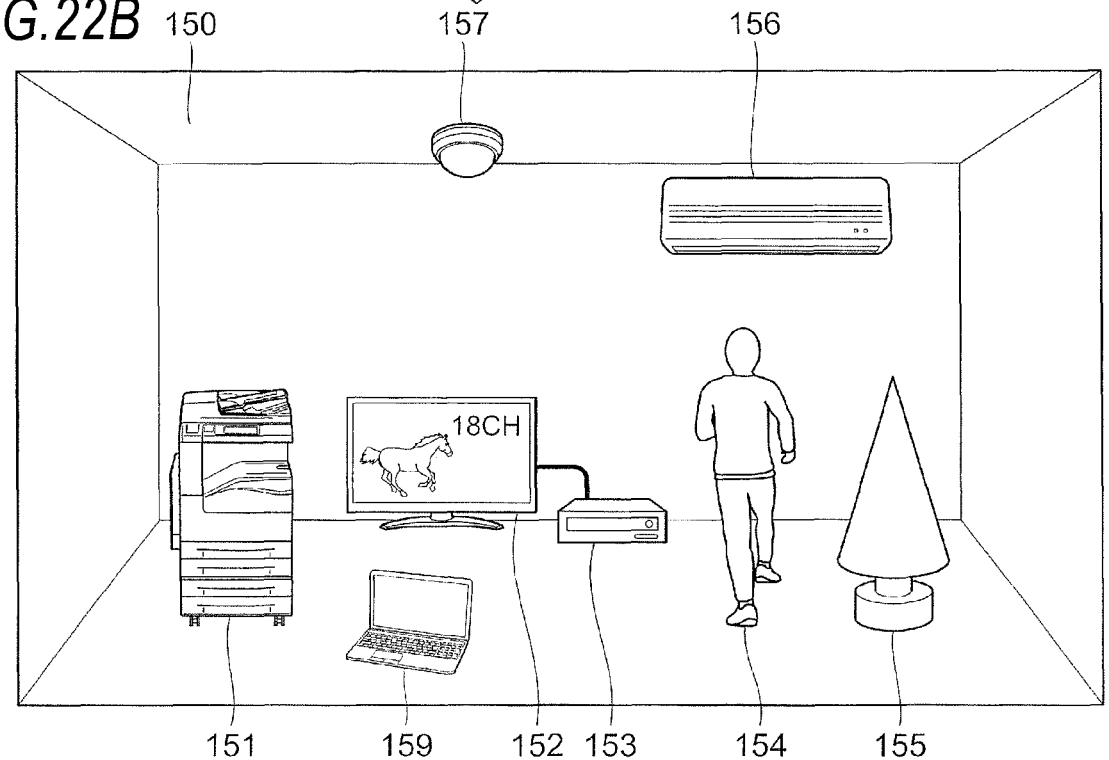

FIGS. 22A and 22B illustrate an example of the workflow process according to a seventh use mode. FIG. 22A illustrates a state in which two images are sequentially selected on the still image 111, and FIG. 22B illustrates an operating situation in a real space.

In the example of FIGS. 22A and 22B, the image 206 of the air conditioner is firstly clicked and the image 204 of the person is secondly clicked. When the information 13A corresponding to this combination is included in the attribute information 16, the computer 110 instructs the real air conditioner 156 to adjust a temperature to be suitable for Mr. A corresponding to the image 204.

Further, it is difficult to record in advance the detailed workflow processes corresponding to all possible combinations in the attribute information 16. Thus, a specific application program operating on the computer 110 may be read through the workflow process defined by the information 13A associated with the individual images and the operation according to the designated combination may be performed in cooperation with the application program on the computer 110 side.

Second Exemplary Embodiment

In the first exemplary embodiment described above, the description has been made of the use modes in which the information 13A describing the workflow process related to each image included in the still image 111 (see FIG. 1) is registered in the attribute information 16 (see FIG. 1) of the JPEG file 10 (see FIG. 1), and which is implemented through the computer 110 (see FIG. 1) reading the information 13A.

Here, the processing function for recording the information 13A in the attribute information 16 of the JPEG file 10 will be described as a second exemplary embodiment.

Figure 23:
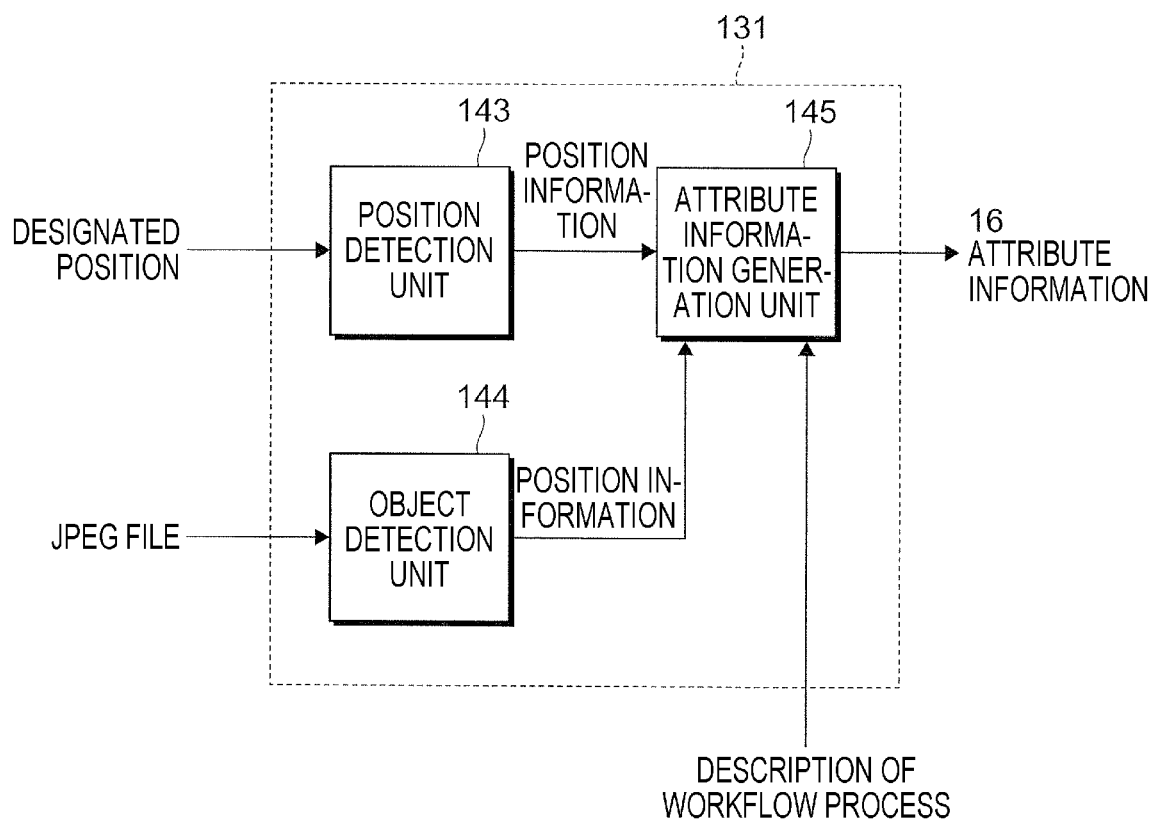
FIG. 23 is a block diagram illustrating an example of a functional configuration of the controller expressed from the viewpoint of recording information that defines the workflow process.

FIG. 23 is a block diagram illustrating an example of the functional configuration of the controller 131 expressed from the viewpoint of recording the information 13A defining the workflow process.

The controller 131 of the present exemplary embodiment functions as a position detection unit 143 that detects a region of an object designated by the user, an object detection unit 144 that detects a region of an image to be registered as an object using an image processing technology from the image data 14 (see FIG. 1) of the JPEG file 10, and an attribute information generation unit 145 that generates the attribute information 16 in association with a workflow process corresponding to each detected region.

Figure 24:
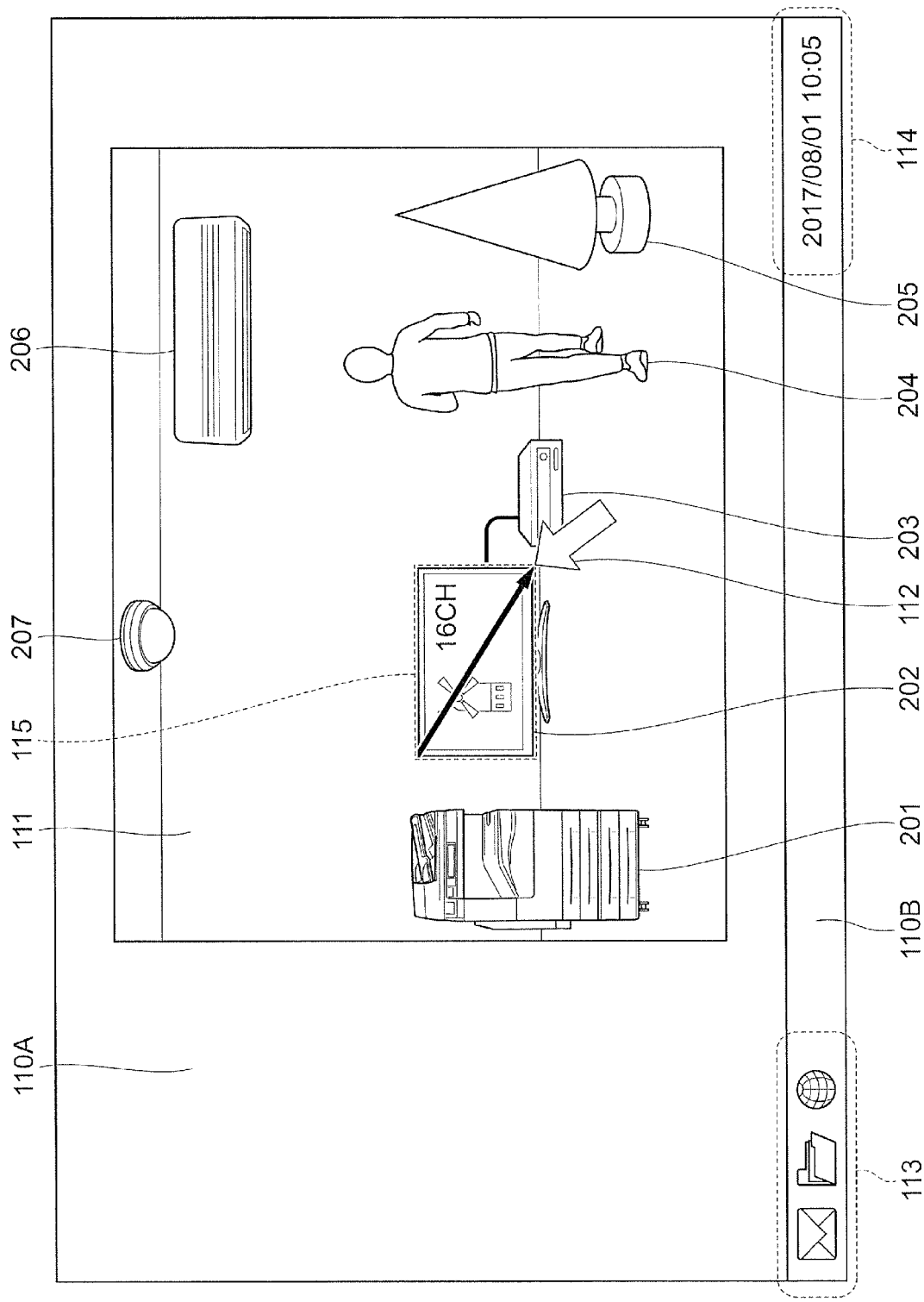
FIG. 24 is a view illustrating an example of designating an object region by a user.

FIG. 24 is a view illustrating an example of designation of an object region by the user. In FIG. 24, the region 115 is set so that the display region of the image 202 of the display device, which is one of the images in the still image 111, is surrounded by a broken line due to dragging of the mouse pointer 112.

The position detection unit 143 outputs, as coordinate information for defining the region 115, for example, coordinate values of the upper left corner which is the start of the dragging, and the number of pixels moved in the vertical direction and the number of pixels moved in the horizontal direction until the end of the dragging.

The object detection unit 144 is used when an image (registered image) of an image for recording the information 13A is registered in advance. The object detection unit 144 performs a matching process between the image data 14 included in the JPEG file 10 and the registered image to output the coordinate information specifying the region where the image (object) matching the registered image exists as position information.

The attribute information generation unit 145 executes a process of associating a description of the workflow process input through another screen or prepared in advance with each position information. In this exemplary embodiment, the workflow process is described in the JSON format.

Further, when an article in the real space corresponding to the image is a device, the serial number that specifies each device through the IoT network and the address information of each device on the IoT network may be collected at the time of capturing the still image 111 and associated with the still image 111 so that the labor of manually inputting the serial number and the like of each device may be omitted.

In addition, as described in the first exemplary embodiment, an article in the real space corresponding to each image is not necessarily a real article corresponding to each image.

Figure 25A:
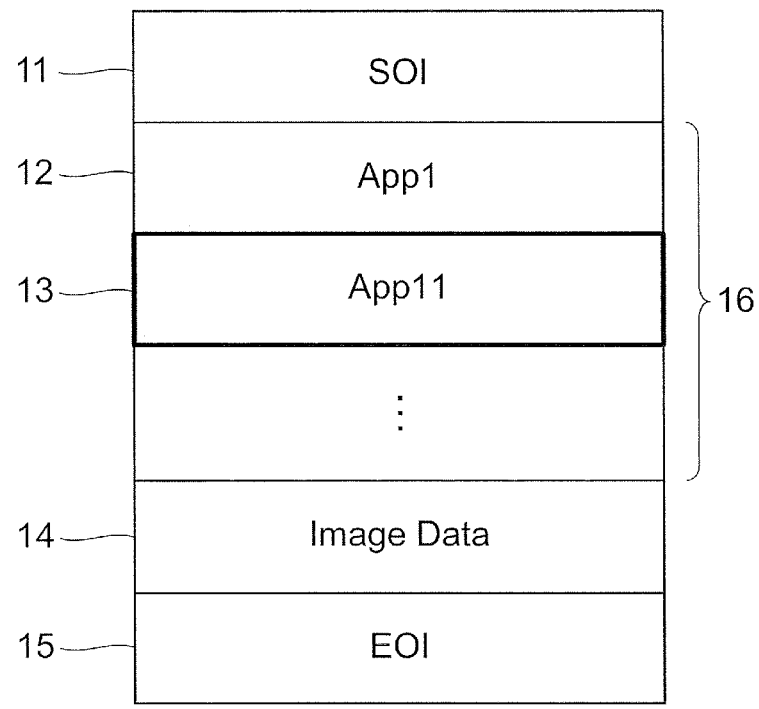
FIGS. 25A and 25B are views illustrating writing of information that defines the workflow process into attribute information.
Figure 25B:
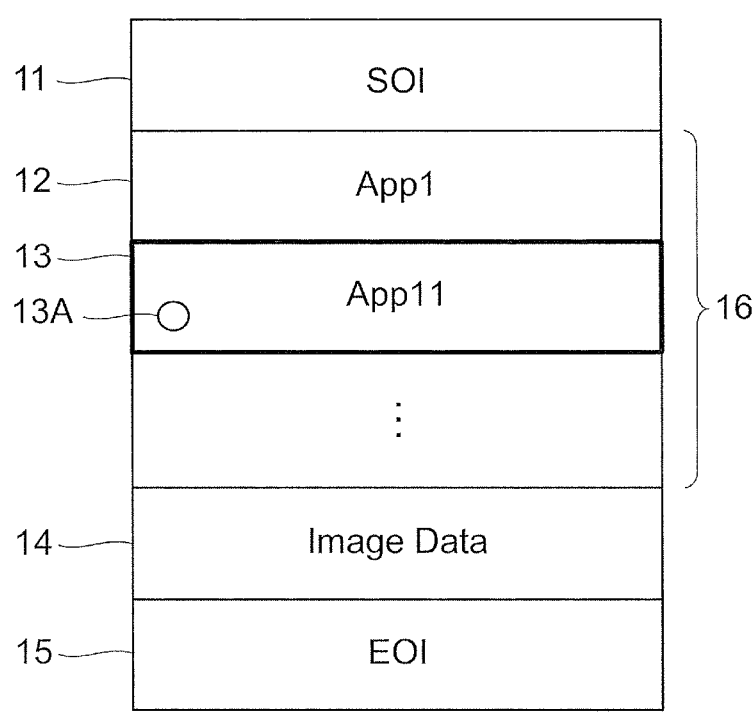

FIGS. 25A and 25B are views illustrating writing of the information 13A defining the workflow process into the attribute information 16. FIG. 25A illustrates a data structure before the information 13A is included in the attribute information 16 of the JPEG file 10, and FIG. 25B illustrates a state in which the information 13A is added to the attribute information 16 of the JPEG file 10.

In this way, the information 13A defining the workflow process may be added to the existing JPEG file 10 later.

In the meantime, a user may input the contents of the workflow process to be described in the information 13A, one piece by one piece. Alternatively, a technique of giving the contents according to the designated image by the attribute information generation unit 145 (see FIG. 23) or a technique of presenting the contents to the user may be adopted.

For example, when the image 201 of the image forming device is designated in the still image 111 (see FIG. 24) (in other words, when an image of a device is designated), the attribute information generation unit 145 may read and apply the contents defining the control of the image 201 of the image forming device from the database (not illustrated).

For example, when the image 205 of the planted tree is designated in the still image 111 (see FIG. 24) (in other words, when an image of an article that cannot be operated is designated), the attribute information generation unit 145 may read and apply the contents defining the display of information on the image 205 of the planted tree from the database (not illustrated).

In addition, for example, the attribute information generation unit 145 may read and apply the information from the database (not illustrated) according to the data and time when the still image 111 is captured. The capturing date and time are described as Exif information in, for example, the attribute information 16.

Figure 26A:
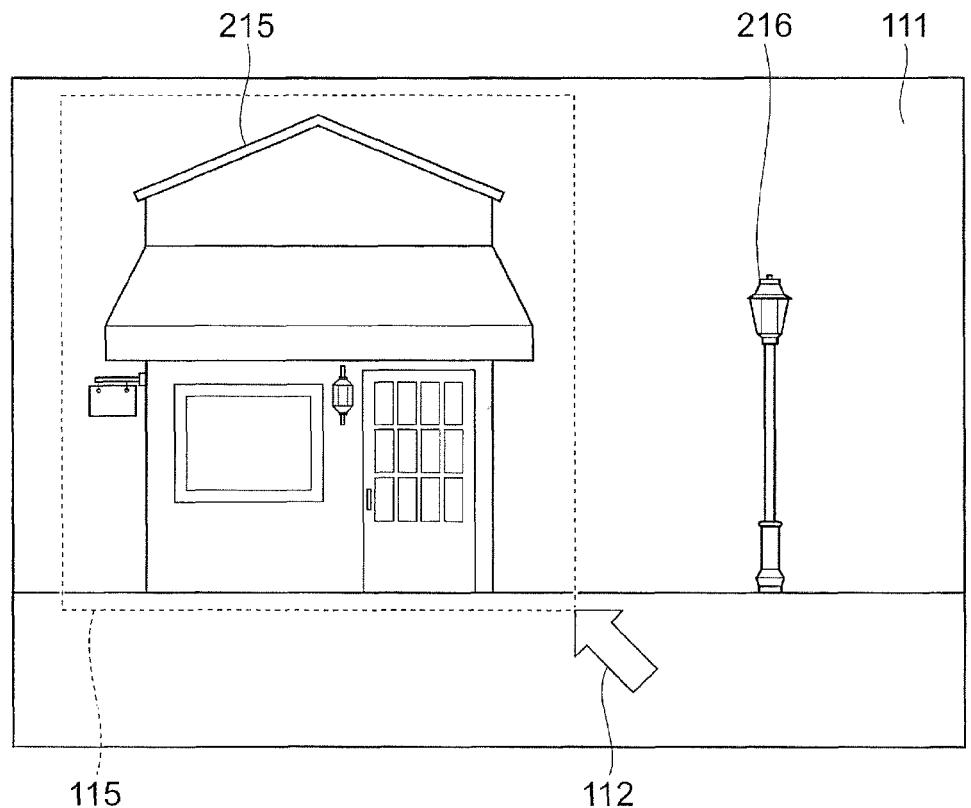
FIGS. 26A and 26B are views illustrating an example of the workflow process described in information when capturing is performed in the daytime.
Figure 26B:
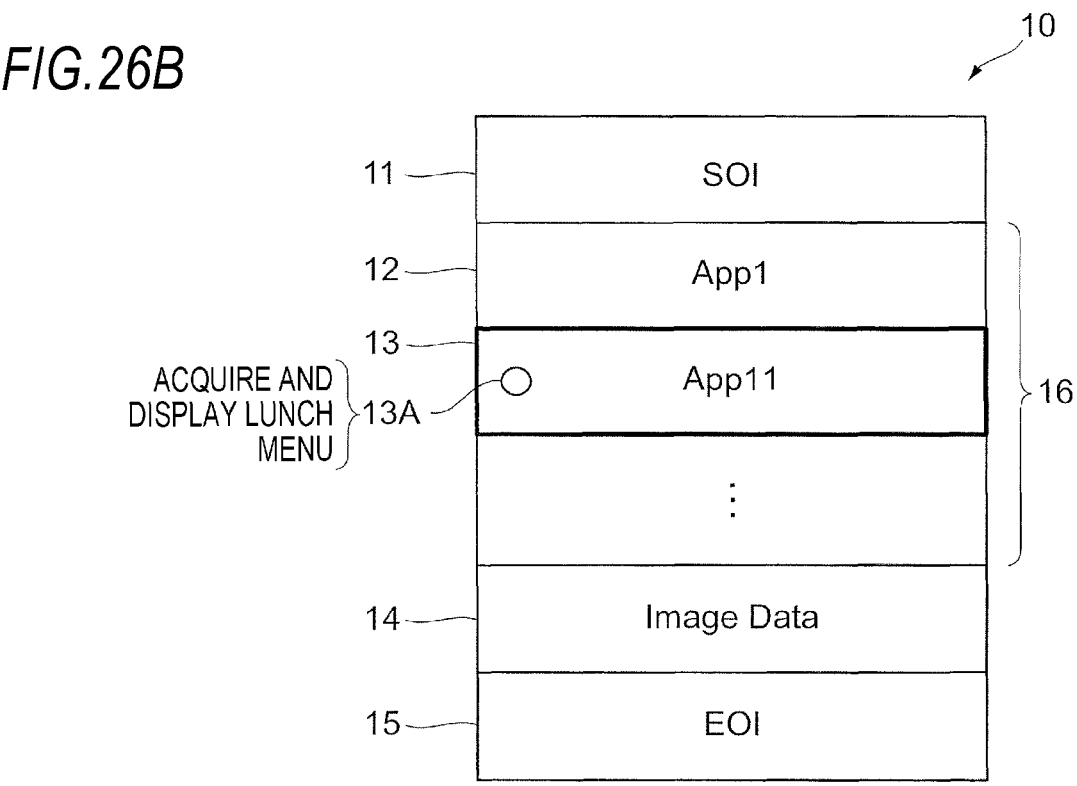

FIGS. 26A and 26B are views illustrating an example of the workflow process described in the information 13A when capturing is performed in the daytime. FIG. 26A illustrates a still image 111, and FIG. 26B illustrates the contents of the information 13A described in the JPEG file 10.

In the example of FIGS. 26A and 26B, the still image 111 includes a restaurant image 215 and a streetlight image 216, and the mouse pointer 112 designates the region 115 of the restaurant image 215. Here, the attribute information generation unit 145 (see FIG. 23) reads the workflow process of "acquiring and displaying the lunch menu" from the database (not illustrated) and writes the workflow process in the attribute information 16.

Figure 27A:
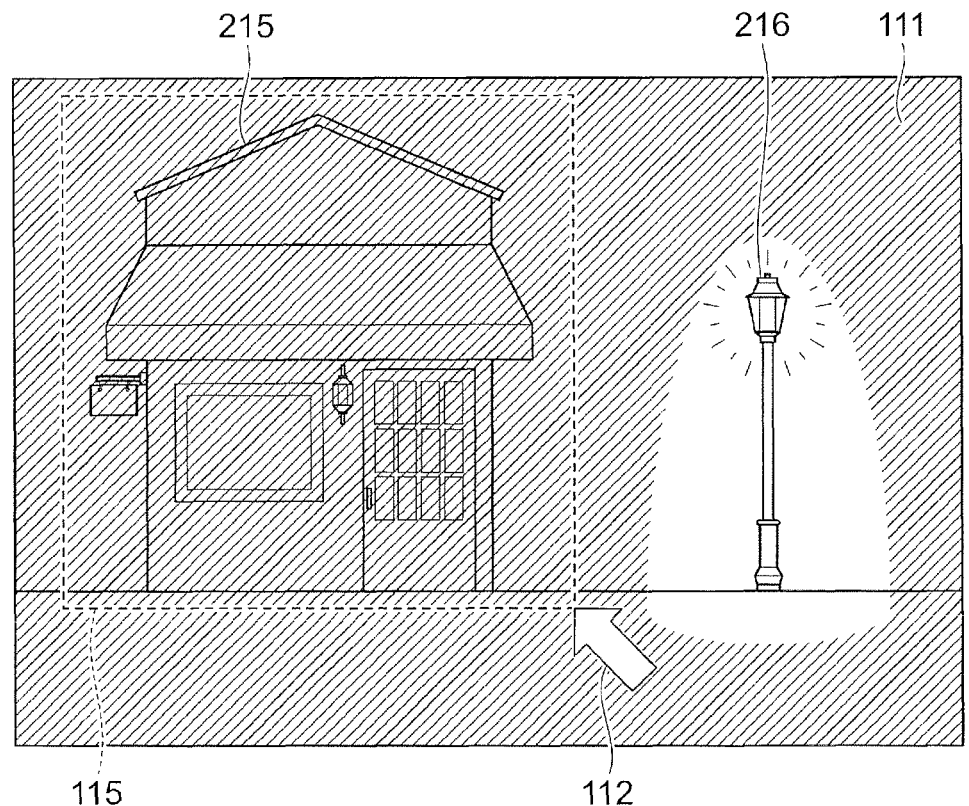
FIGS. 27A and 27B are views illustrating an example of the workflow process described in information when capturing is performed at night.
Figure 27B:
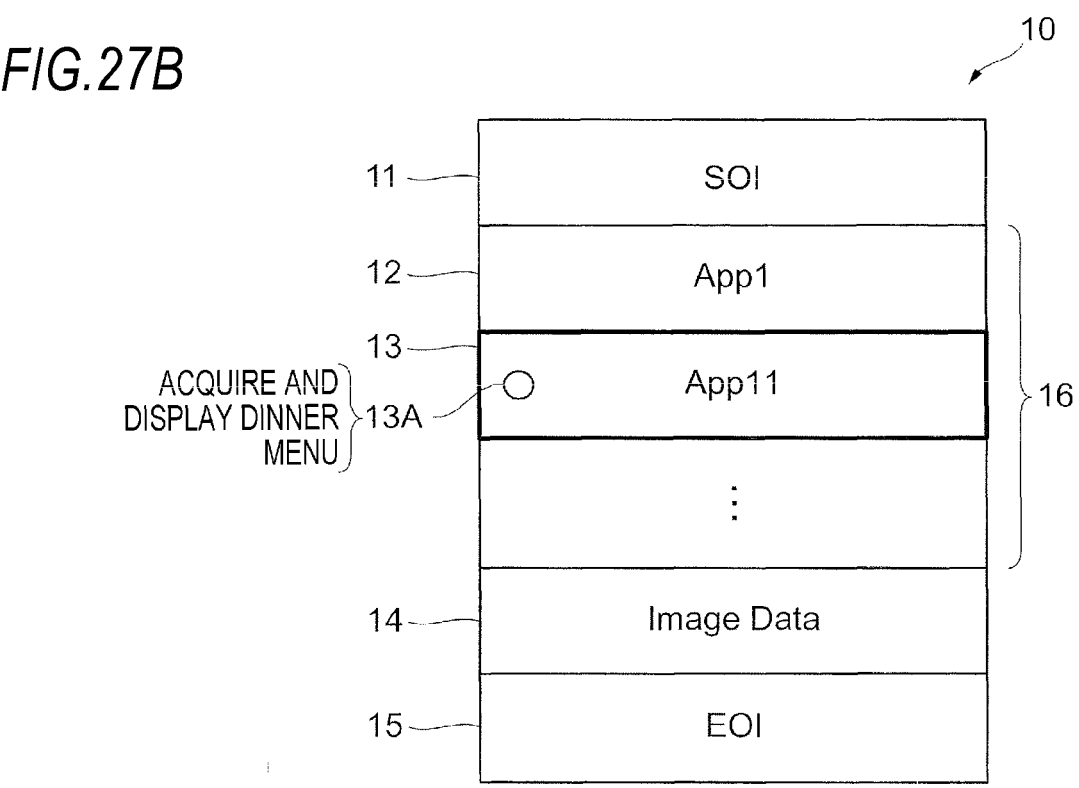

FIGS. 27A and 27B are views illustrating an example of the workflow process described in information 13A when capturing is performed at night. FIG. 27A illustrates a still image 111, and FIG. 27B illustrates the contents of the information 13A described in the JPEG file 10.

In the case of FIGS. 27A and 27B, the still image 111 includes a restaurant image 215 and a streetlight image 216, and the mouse pointer 112 designates the region 115 of the restaurant image 215. The attribute information generation unit 145 (see FIG. 23) reads the workflow process of "acquiring and displaying the dinner menu" from the database (not illustrated) and writes the workflow process in the attribute information 16.

Further, the attribute information generation unit 145 may determine the contents of the workflow process to be described in the attribute information 16 in accordance with the capturing season (for example, spring, summer, autumn, winter), based on the capturing date.

Other Exemplary Embodiments

Although the exemplary embodiments of the present invention have been described above, the technical scope of the present invention is not limited to the ranges described in the above exemplary embodiments. It is also apparent from the description of the claims that various modifications or improvements to the above exemplary embodiments are included in the technical scope of the present invention.

For example, in the above exemplary embodiments, the JPEG file 10 of a still image has been presented as an example of the file format of an image. It should be noted that the applicable file format is not limited to a still image or a JPEG file but may be a moving image or file formats other than JPEG.

Figure 28A:
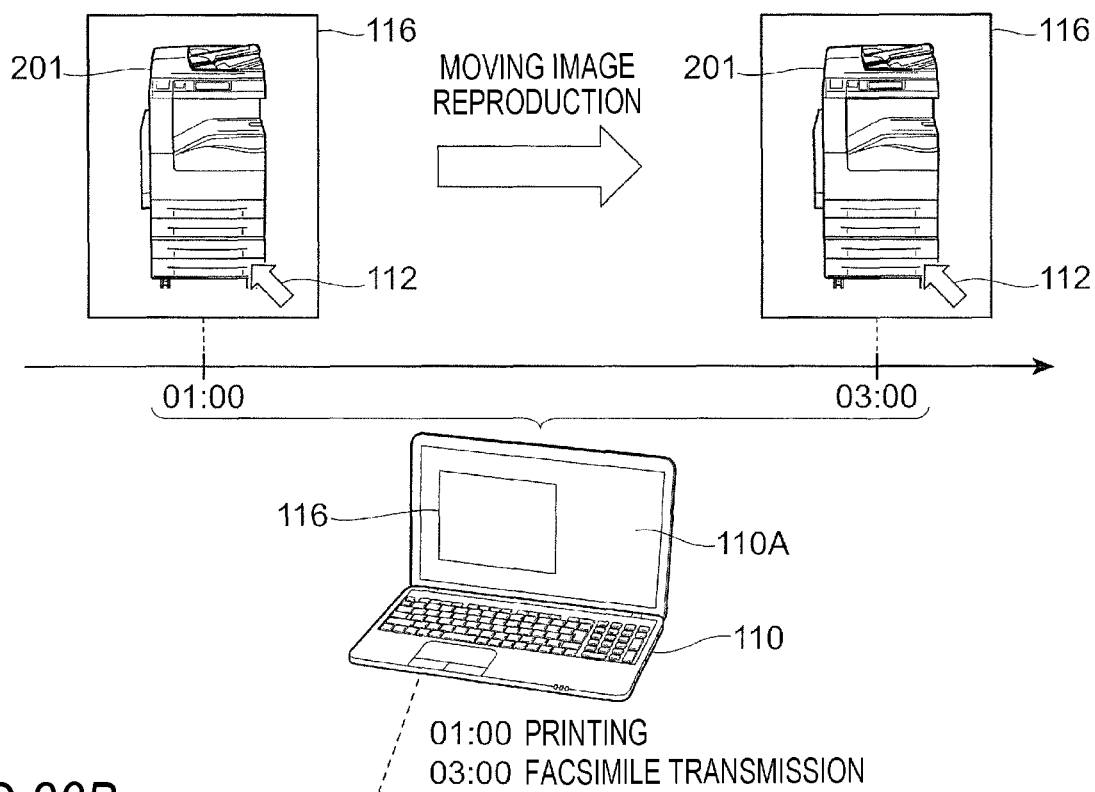
FIGS. 28A and 28B are views illustrating an example of the workflow process executed in the case of a moving image.
Figure 28B:
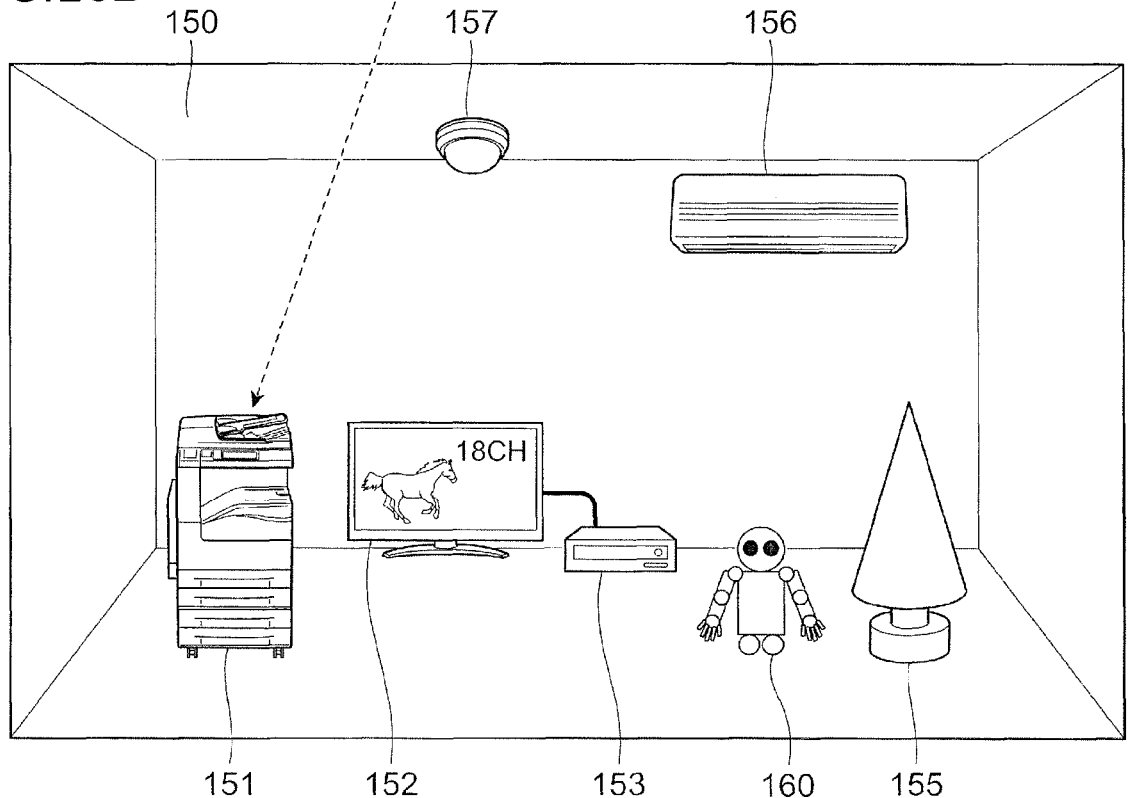

FIGS. 28A and 28B are views illustrating an example of the workflow process executed in the case of a moving image. FIG. 28A illustrates designation of an image during reproduction of the moving image, and FIG. 28B illustrates the operation performed in the real space.

The example illustrated in FIGS. 28A and 28B represents a case in which the moving image 116 is displayed on the operation screen 110A of the computer 110. Information (time, minute, second, frame, and the like) indicating the position on the time axis of each frame is recorded in the moving image 116.

The example of FIGS. 28A and 28B illustrates a case where the image 201 of the image forming device is clicked by the mouse pointer 112 after 1 minute and 3 minutes from the start of reproduction. Further, since the moving image 116 is displayed on the operation screen 110A, the period (not illustrated) may be displayed or may not be displayed.

In the case of the moving image 116, the information 13A corresponding to each point in time is recorded in the image of each frame corresponding to the still image. The workflow process described in the information 13A may be the same at each point in time or may be different from each other. In the case of FIGS. 28A and 28B, the workflow process for instructing printing is described in the image 201 of the image forming device in the frame after 1 minute from the start of reproduction, and the workflow process for instructing facsimile transmission is described in the image 201 of the image forming device in the frame after 3 minutes from the start of reproduction. Therefore, a corresponding instruction is transmitted from the computer 110 according to the designation of each image.

Further, in this example, it is assumed that the workflow process described in the information 13A is executed simultaneously with the image designation by the mouse pointer 112. When a screen for instructing the operation is displayed during the workflow process, an instruction to the image forming device 151 is transmitted after an execution button or the like is operated.

Figure 29A:
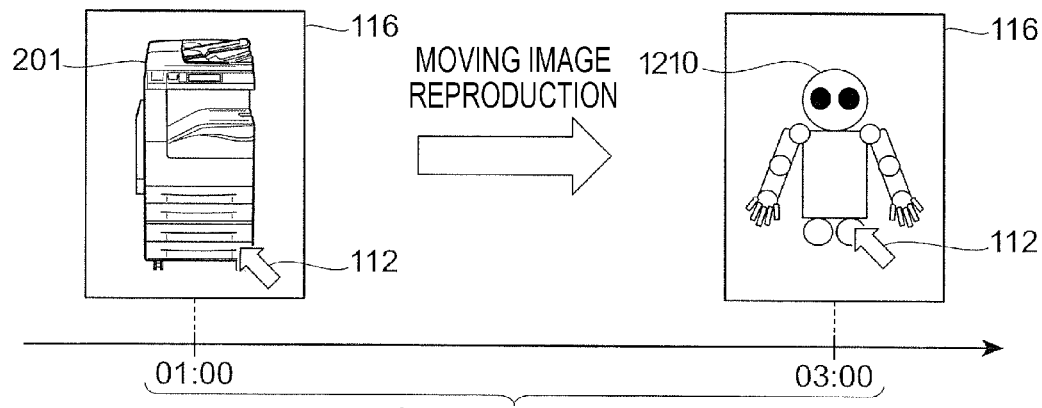
FIGS. 29A and 29B are views illustrating another example of the workflow process executed in the case of a moving image.
Figure 29B:
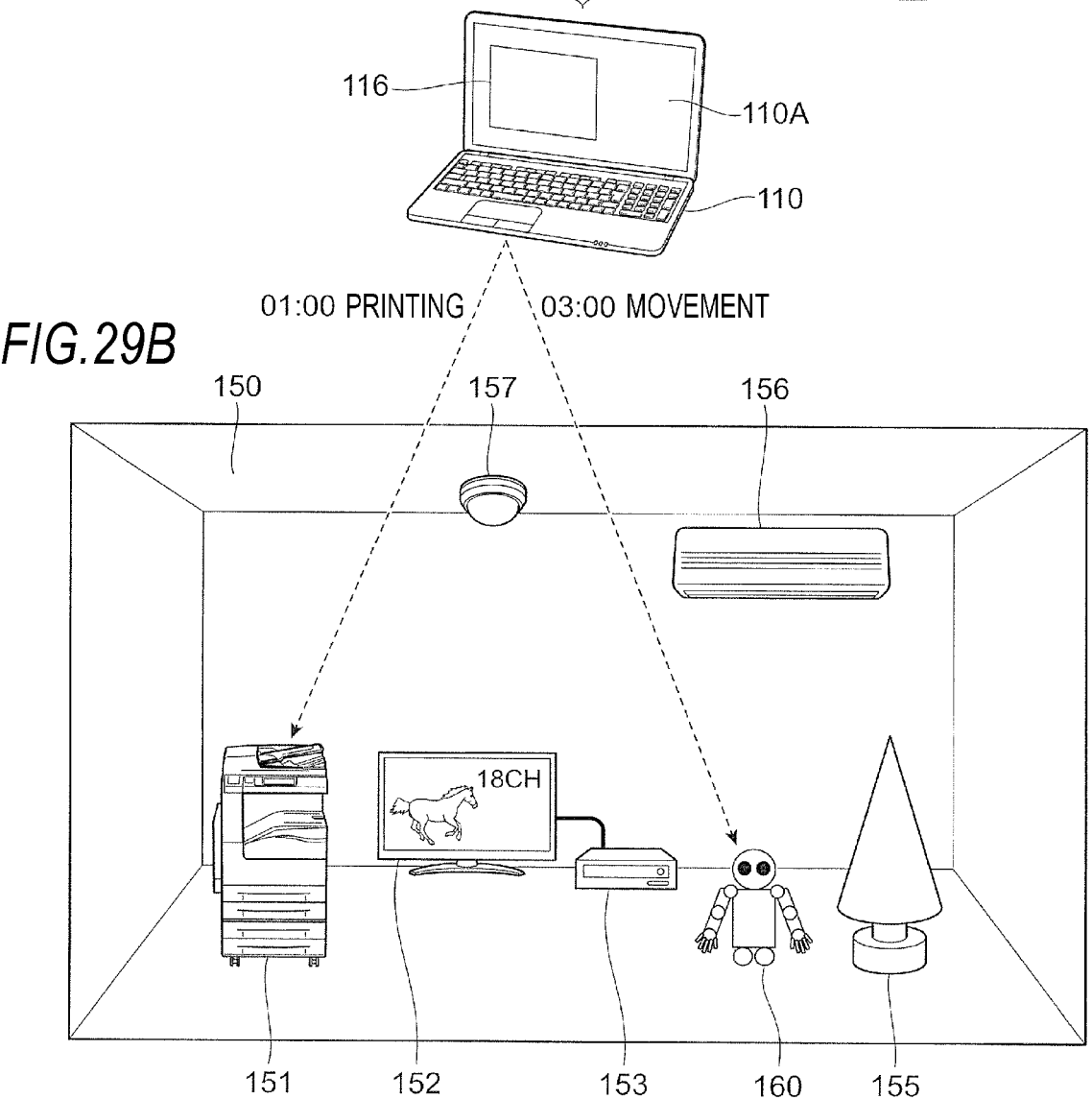

FIGS. 29A and 29B are views illustrating another example of the workflow process executed in the case of a moving image. FIG. 29A illustrates designation of an image during reproduction of the moving image, and FIG. 29B illustrates the operation performed in the real space.

The example of FIGS. 28A and 28B illustrates that the image displayed after 1 minute from the start of reproduction and the image displayed after 3 minutes from the start of reproduction are the same, while the example of FIGS. 29A and 29B illustrates a case where the images are different from each other. In the example of FIGS. 29A and 29B, the image 201 of the image forming device is displayed after 1 minute from the start of reproduction, and the image 1210 of the robot is displayed after 3 minutes. In the example of FIGS. 29A and 29B, printing is instructed to the image forming device 151 after 1 minute from the start of reproduction, while movement is instructed to the robot 160 after 3 minutes from the start of reproduction.

As described above, in the case of the moving image, the workflow process defined by the information 13A (see FIG. 1) included in the attribute information 16 (see FIG. 1) at each point in time (frame) is executed.

Figure 30A:
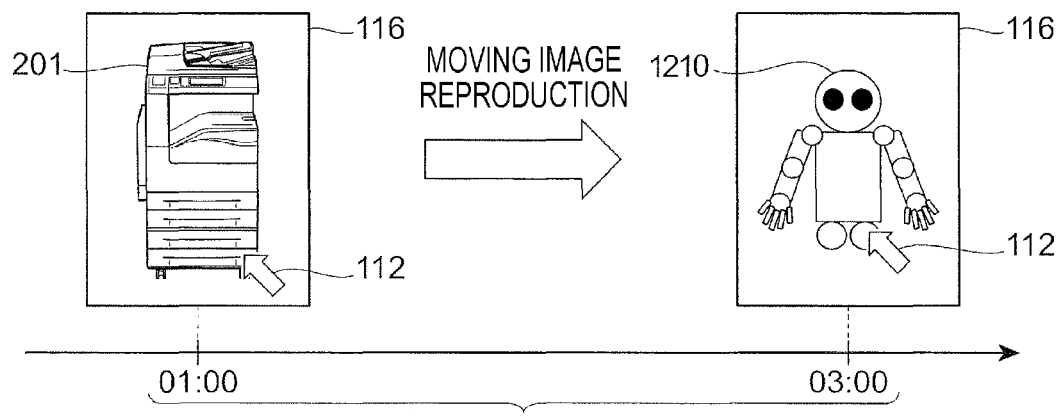
FIGS. 30A and 30B are views illustrating another example of the workflow process executed in the case of a moving image.
Figure 30B:
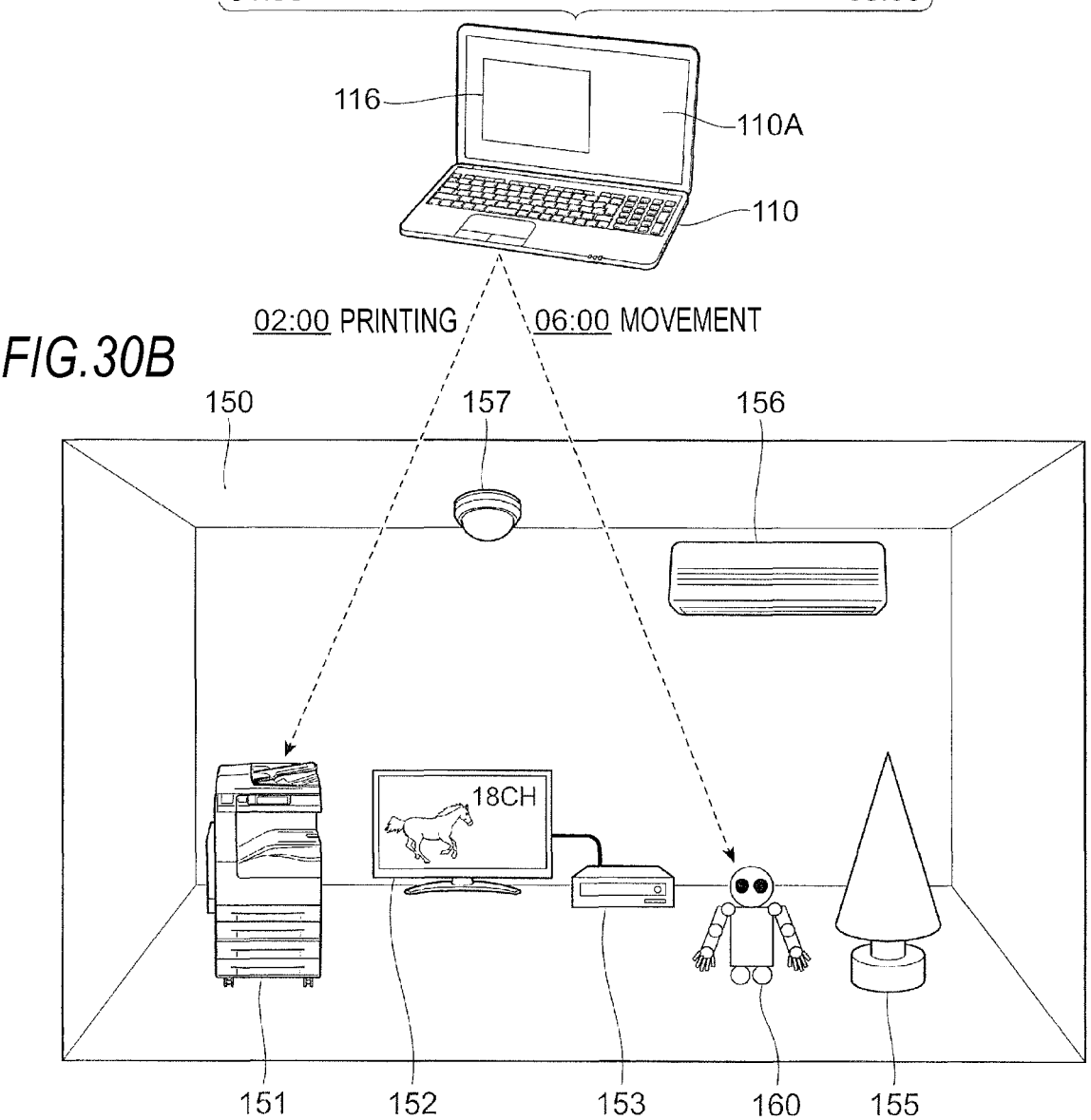

FIGS. 30A and 30B are views illustrating another example of the workflow process executed in the case of a moving image. FIG. 30A illustrates designation of an image during reproduction of the moving image, and FIG. 30B illustrates the operation performed in the real space.

The example of FIGS. 30A and 30B illustrates a case where a waiting time until an instruction is transmitted from the computer 110 to an article corresponding to each image (for example, the image forming device 151 and the robot 160) is determined according to a time elapsed from the start of reproduction until a time at which each image is designated or until the execution of the workflow process is instructed.

For example, in the case of FIGS. 30A and 30B, the printing instruction according to designation of the image 201 of the image forming device after 1 minute from the start of reproduction is transmitted at 2 minutes which are 1 minute later. In addition, the movement instruction according to the designation of the image 1210 of the robot after 3 minutes from the start of reproduction is transmitted at 6 minutes which are 3 minutes later.

The time to wait for execution is not necessarily the same as the time elapsed from the start of reproduction until the image is designated. For example, the time to wait for execution may be half of the elapsed time from the start of reproduction.

Also, in the above-described technique, as the time from the start of reproduction becomes longer, the waiting time until the instruction to the corresponding article is transmitted becomes longer. Alternatively, the waiting time may be set according to the reproduction time at which the image is designated.

In any case, the waiting time until the instruction is transmitted to the corresponding article is changed according to the reproduction time of the moving image at which the image is designated, so that various control of the real space 150 using the moving image may be implemented.

In the above-described exemplary embodiments, the workflow process is recorded in a portion of the attribute information 16 using the JSON format. Alternatively, the workflow process may be recorded in a portion of the attribute information 16 in the format of sound data or a text format other than the JSON format or recorded in another file associated with the JPEG file 10. For example, when there is a limit on the data region allocated to the attribute information 16, the workflow process may be recorded as another file.

When the workflow process is recorded in the format of sound data, the reproduction sound of the sound data may be analyzed to perform the corresponding workflow process. In this case, the sound data may be recorded as a combination of tone signals. Further, the workflow process may be executed by analyzing the frequency components and waveform patterns without reproducing the sound data.

In the above-described exemplary embodiments, the workflow process is executed by the computer 110 displaying the still image 111. Alternatively, the workflow process may be executed on the server device 120 connected to the computer 110 and the processing result may be given to the computer 110. In addition, the server device 120 may communicate with a device and the like in the real space 150 to execute the workflow process.

In the above-described exemplary embodiments, when an image associated with the information 13A (see FIG. 1) is designated on a still image, the associated workflow process is only executed. Alternatively, the operation of the user during the execution of the workflow process may be recorded and added to the existing information 13A. With this function, what the user is required is only to designate a specific image and the user may omit subsequent operations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

What is claimed is:

1. An information processing apparatus comprising:
a processor, configured to:
recognize a user's designation for an image including an object associated with attribute information, wherein a data structure of an image file of the image comprises a first data region and a second data region, wherein the first data region stores image data of the image, and wherein the second data region stores the attribute information of the image, wherein the attribute information defines a workflow process to be executed based on information related to a real device in a real space, and wherein the real device corresponds to the object on the image; and
when the user's designation of the object on the image is recognized, executes the workflow process associated with the real device based on the attribute information associated with the object and the information related to the real space.

2. The information processing apparatus according to claim 1, wherein the processor communicates with the real device that is the object designated by the user through the workflow process so as to acquire the information related to the real space.

3. The information processing apparatus according to claim 2, wherein the processor changes a display of the object on the image based on the information related to the real space.

4. The information processing apparatus according to claim 2, wherein the processor displays a notification screen that prompts the user to perform a specific action based on the information related to the real space.

5. The information processing apparatus according to claim 2, wherein the processor displays a screen for operating a function of the real device, which corresponds to the object, based on the information related to the real space.

6. The information processing apparatus according to claim 2, wherein the processor transmits an instruction to the real device, which corresponds to the object, or another real device in the real space based on the information related to the real space.

7. The information processing apparatus according to claim 1, wherein the processor transmits an instruction to the real device, which corresponds to the object, based on a designated portion of the object.

8. The information processing apparatus according to claim 1, wherein
the image includes a plurality of the objects, and
when a plurality of real devices, which correspond to the objects, are designated on the image, the processor transmits an instruction to cooperatively operate the plurality of real devices through the workflow process.

9. The information processing apparatus according to claim 8, wherein the processor changes contents of the instruction to cooperatively operate the plurality of real devices based on an order in which the plurality of real devices are designated.

10. The information processing apparatus according to claim 9, wherein the processor changes the contents of the instruction to cooperatively operate the plurality of real devices based on designated portions of the objects.

11. The information processing apparatus according to claim 8, wherein the processor changes contents of the instruction to cooperatively operate the plurality of real devices based on a display state of the designated objects.

12. The information processing apparatus according to claim 1, wherein
the image is a moving image, and
when the designation of the object is recognized at different reproduction times of the image from each other, the processor executes the workflow process based on the attribute information at each reproduction time and the information related to the real space.

13. The information processing apparatus according to claim 1, wherein
the image is a moving image, and
when the designation of the object is recognized at different reproduction times of the image from each other or when execution of the workflow process is instructed at the different reproduction times of the image, the processor waits for transmission of an instruction to a corresponding article by a time that is determined according to an elapsed time from a reproduction start time of the image to each reproduction time.

14. The information processing apparatus according to claim 1, wherein the processor communicates with a sensor disposed in the real space so as to acquire the information related to the real space.

15. The information processing apparatus according to claim 14, wherein the processor changes a display of the object on the image based on the information related to the real space.

16. The information processing apparatus according to claim 14, wherein the processor displays a notification screen that prompts the user to perform a specific action based on the information related to the real space.

17. The information processing apparatus according to claim 14, wherein the processor displays a screen for operating a function of the real device associated with the designated object based on the information related to the real space.

18. The information processing apparatus according to claim 1, wherein the information related to the real space is information at a time when the designation of the object is recognized.

19. The information processing apparatus according to claim 1, wherein the information related to the real space is environmental information.

20. The information processing apparatus according to claim 1, wherein a data file of the image is compliant with the JPEG format, and the attribute information is described in a JSON format.

21. The information processing apparatus according to claim 1, wherein the workflow process is described in a format of sound data.

22. The information processing apparatus according to claim 1, wherein the workflow process is described in a format of text data.

23. The information processing apparatus according to claim 1,
wherein the first data region stores a main body of the image, and
wherein the second data region stores attribute information of the main body of the image and includes information that defines the workflow process as a portion of the attribute information.

24. An information processing apparatus comprising:
a detector that detects a region portion corresponding to an object designated by a user on an image or detects a region portion on the image where a predetermined object exists; and
a processor that describes information that defines a workflow process in a portion of attribute information included in a data file of the image, the workflow process being to be executed based on information related to a real device in a real space when the object associated with the detected region portion is designated, wherein a data structure of an image file of the image comprises a first data region and a second data region, wherein the first data region stores image data of the image, wherein the second data region stores the attribute information of the image, and wherein the real device corresponds to the object on the image.

25. The information processing apparatus according to claim 24, wherein when the designated object is the real device, the processor describes information that defines control of the real device as the workflow process.

26. The information processing apparatus according to claim 24, wherein when the designated object is an article that cannot be operated, the processor describes information that defines a display of information on the article as the workflow process.

27. The information processing apparatus according to claim 24, wherein the processor describes information corresponding to a date and time when the image is captured as the workflow process.

28. A non-transitory computer readable medium storing a program causing a computer to execute information processing, the information processing comprising:
recognizing a user's designation for an image including an object associated with attribute information, wherein the attribute information defines a workflow process to be executed based on information related to a real device in a real space, and wherein the real device corresponds to the object on the image; and
when the user's designation of the object on the image is recognized, executing the workflow process associated with the real device based on the attribute information associated with the object and the information related to the real space, wherein a data structure of an image file of the image comprises a first data region and a second data region, wherein the first data region stores image data of the image, and wherein the second data region stores the attribute information of the image.

* * * * *